United States Patent [19]

Nelson et al.

[11] Patent Number: 5,274,579
[45] Date of Patent: Dec. 28, 1993

[54] DIGITAL TONE DETECTOR

[75] Inventors: Leonard E. Nelson, Boynton Beach; Karen S. Schmoll, Boca Raton, both of Fla.

[73] Assignee: Motorola, Inc., Schaumburg, Ill.

[21] Appl. No.: 28,714

[22] Filed: Mar. 9, 1993

Related U.S. Application Data

[63] Continuation of Ser. No. 813,067, Dec. 23, 1991, abandoned, which is a continuation of Ser. No. 460,214, Jan. 2, 1990, abandoned.

[51] Int. Cl.[5] ............................................. G06F 15/31
[52] U.S. Cl. ................................................ 364/724.09
[58] Field of Search ............... 364/724.09, 724.08, 364/724.01, 572

[56] References Cited

U.S. PATENT DOCUMENTS

| | | | |
|---|---|---|---|
| 3,803,390 | 4/1974 | Schaepman | 364/724.09 |
| 4,021,653 | 5/1977 | Sharp et al. | 364/724.09 |
| 4,038,540 | 7/1977 | Roberts | 364/724.09 |
| 4,216,463 | 8/1980 | Backof et al. | 364/724.09 |
| 4,302,817 | 11/1981 | Labedz | 364/724.09 |
| 4,513,385 | 4/1985 | Muri | 364/724.09 |

OTHER PUBLICATIONS

"A Digital Receiver for Tone Detection Applications" by Theo A. C. M. Claasen and J. B. H. Peek in the IEEE Transactions on Communications, vol. 24, No. 12, Dec. 1976 pp. 1291–1300.

Primary Examiner—Tan V. Mai
Attorney, Agent, or Firm—Philip P. Macnak; Thomas G. Berry; Daniel R. Collopy

[57] ABSTRACT

A digital tone detector utilizes pseudo sinusoidal quadrature reference signals in combination with a unique summation rule for summing the resultant quadrature accumulations to obtain a substantial improvement in the sidelobe responses of the filter. The digital tone detector also utilizes a "stepped" observation window to further provide a substantial improvement in the third harmonic response of the filter. The digital tone detector can be implemented using a hardware implementation, a combination hardware and microprocessor implementation, and a microprocessor only implementation.

20 Claims, 16 Drawing Sheets

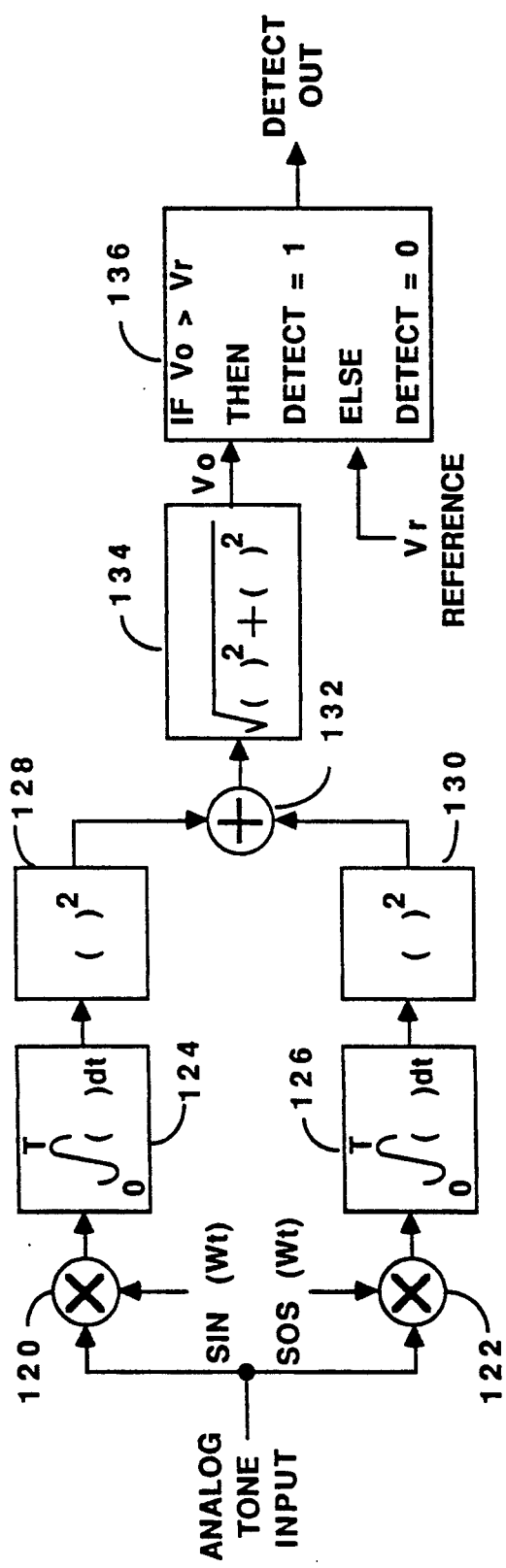
*PRIOR ART*
FIG. 1B
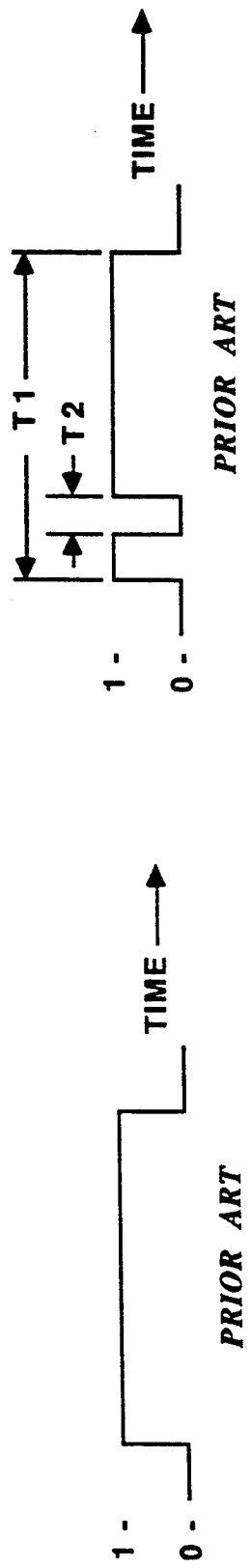
*PRIOR ART*
FIG. 3
*PRIOR ART*
FIG. 2

800

1000

DIGITAL TONE DETECTOR

This is a continuation of U.S. patent application Ser. No. 07/813,067 filed Dec. 23, 1991, now abandoned, which is a continuation of U.S. patent application Ser. No. 07/460,214 filed Jan. 2, 1990, now abandoned.

BACKGROUND OF THE INVENTION

1. Field of the Invention

The present invention relates to digital tone detector circuits and more particularly to a digital tone detector circuit providing reduced sidelobe and harmonic responses.

2. Description of the Prior Art

Analog tone detectors utilizing analog tone filters have been used for many years in communication receivers to provide selective call signaling capability. Such detectors, while they have proven suitable for use in many applications, have become less desirable for use in new applications because of a number of problems, such as cost, and inventory requirements for replacement and re-coding of the selective call addresses. A number of digital microcomputer based detectors have been devised to replace the analog tone filter designs to alleviate the aforementioned problems. Many of these microcomputer based detectors have utilized cross correlation detector implementations for detecting the possible presence of periodic signals of known frequency that may be buried in noise, as would exist in weak signal conditions. The cross correlation detection technique utilized up to now is, of course, well known; however, practical implementation of this method has up to now necessarily entailed performance compromises. In particular, many of these early detector implementations have had high susceptibility to false detection due to signals at harmonics of the desired signal. Most of the early detectors have also generally exhibited excessive sidelobe responses that limited the "detection threshold", the limit at which signals can be detected in noise. Other of the early detectors exhibited responses that were dependent upon the phase of the input signal which further limited the "detection threshold" and further increased the susceptibility to falsing. In order to overcome the falsing problems of these early detectors, the detector sensitivity had to be reduced as compared to some of the analog active filter detectors which resulted in reduced receiver signaling sensitivity. These early microcomputer based detectors required high clock rates (3 to 8 MHz), which resulted in increased power consumption as compared to the earlier active filter detectors.

One of the earliest phase independent implementations of a microcomputer based detectors is described in U.S. Pat. No. 4,302,817 to Labedz which is assigned to the assignee of the present invention. A simplified block diagram of the Labedz tone detector is shown in FIG. 1A which is largely based on the earlier prior art analog phase independent correlation detector shown in FIG 1B. The Labedz detector greatly simplified the design of a digital tone detector. In the place of the analog tone input signals, the Labedz detector utilized limited data input signals. The analog sin (Wt) and cos (Wt) reference signals were converted to squares wave reference signals SQS (Wt) and SQC (Wt). The limited data input signals and square wave reference signals SQS (Wt) and SQC (Wt) had one of two values, namely $+1$ or $-1$, to ease the digital processing. In the Labedz detector, the analog multiplications 120 and 122 in FIG. 1B were replaced by simple Boolean multiplications 100 and 102 in FIG. 1A. The integrators 124 and 126 utilized in the analog design of FIG. 1B were replaced by summers, 104 and 106 in FIG. 1A. The squaring functions 128 and 130 of FIG. 1B required in the analog design were replaced by absolute value circuits, 108 and 110 in FIG. 1A. The outputs of the squaring functions were linearly added 132 in the analog design of FIG. 1B, whereas the outputs of the absolute values circuits are digitally summed in summer 112 of FIG. 1A. The analog square root function 134 required in the analog design of FIG. 1B was replaced by a simple divide by two function 114 in the Labedz detector of FIG. 1A. In actual practice, the divide by two operation was generally omitted, since the output, $K_n$ was compared to a detection threshold, $K_{th}$, which would take into account the divide by two factor. When the detector output $K_n$ exceeded the detection threshold $K_{th}$, as indicated for decision circuit 116 of FIG. 1A, a logical one detect output was generated, indicating the detection of the desired tone; otherwise, the output of the decision circuit 116 remained at a logical zero. A detection in the digital implementation thus corresponds to the output voltage $V_o$ exceeding the reference voltage $V_r$ in FIG. 1B.

While not specifically shown in FIG 1A, the input and reference signals were sampled periodically, and at each sampling instant, the input sample value ($+1$ or $-1$) was multiplied by the reference level ($+1$ or $-1$) and added into the correlation total. The correlation or observation window in time was then $N \times T_s$, where N was the number of samples taken during a predetermined sampling period and $T_s$ was the time interval between samples within the predetermined time period. Further modifications to the decoder of FIG. 1A were required to make the tone detection process pseudo continuous. A tone presence decision was made only once at the end of the correlation window, after every N samples have been taken. For very narrow bandwidths, such as 12 Hz, the tone presence decision would be made only once every 150 msec, as compared to the analog detector where decisions were essentially made after every cycle. In most tone detection applications, detection decisions are needed more frequently. In order to make the decision process somewhat continuous and analogous to the analog tone detection process, the observation window of the early digital decoders was broken down into a number of correlation subwindows, for example M subwindows, and a correlation sum was computed after each subwindow, accumulation or every N/M samples. The total correlation sum was then computed by summing the M subwindow accumulations together. In this way, a new correlation sum was computed after each subwindow. The total summation was then very easy to compute, as the oldest subwindow total was subtracted from the newest subwindow accumulation and the total was then added to the present correlation sum.

While the Labedz tone detector design of FIG. 1A proved to greatly simplify the implementation of a tone detector as compared to the analog designs, the sensitivity of the tone detector was less than the analog tone filter decoder due to increased sidelobe responses and increased harmonic responses, particularly third harmonic responses. As a result detector sensitivity was compromised compared to the prior art analog tone detectors. The sidelobe responses were due largely to the use of a rectangular observation window for the Labedz decoder, as shown in FIG. 2, and the response at the harmonics resulted from the use of rectangular SQS (Wt) and SQC (Wt) reference signals at the tone frequency of interest, as shown in FIG. 4.

Muri, in U.S. Pat. No. 4,513,385 issued Apr. 23, 1985, entitled "Apparatus and Method for Suppressing Side Lobe Response in a Digitally Sampled System" which is assigned to the assignee of the present invention, realized one solution to a portion of the aforementioned problem. Muri described the use of a substantially rectangular observation window T1, as shown in FIG. 3, which omitted sampling of the input signal during a predetermined time interval T2, which resulted in a significant decrease in the undesired side lobe responses. The Muri window function, while suitable for use with tone signaling protocols, such as the ZVEI and CCIR tone signaling protocols having a limited number of tones, such as twelve tones evenly spaced between 350 Hz and 3100 Hz, was found to be unsuitable for decoding numerous closely spaced tones, such as found in the Motorola Quik-Call II signaling protocol, which utilizes sixty tones spaced at 2.77% frequency intervals between 280 Hz and 3100 Hz.

SUMMARY OF THE INVENTION

It is an object of the present invention to provide a digital tone detector having reduced sidelobe responses.

In a first aspect of the present invention a method of processing an input signal for the detection of at least one desired tone of a plurality of tones comprises the steps of:

generating quadrature phase reference signals using a quadrature phase reference signal generating means, the quadrature phase reference signals having periods representative of the desired tone frequency, and comprising a sequence of time intervals representing a predetermined number of phase sub regions within the desired tone period, the phase reference signal amplitude generated within the phase sub regions have corresponding pairs of phase amplitude values generated in a predetermined order from at least four predetermined amplitude values;

sampling the input signal, using a signal sampling means, at a predetermined sampling rate to obtain a sequence of sampled input signals, the sampled input signals being obtained during corresponding phase sub regions in accordance with the predetermined sampling rate;

generating first and second correlation product values using a subwindow accumulating means to separately multiply the sampled input signal values with the pair of phase amplitude values corresponding thereto;

generating first and second correlation sum values using a summing means to sum separately a predetermined number of the first and second correlation product values;

obtaining absolute values of the first and second correlation sum values using an absolute value generating means, and combining the absolute values, in a predetermined manner, within combining means to generate a total correlation sum value; and comparing, with a comparing means, the total correlation sum value to a predetermined threshold value, and in response thereto, generating a detection signal indicating the detection of the desired tone when the total correlation sum value exceeds the predetermined threshold value.

In accordance with a second aspect of the present invention, a method of processing an input signal for the detection of at least one desired tone of a plurality of tones, said method comprising the steps of:

generating a reference signal pattern using a reference signal pattern generating means, the reference signal pattern having a period representative of the desired tone frequency and which provides an observation window comprising a predetermined number of subwindow time intervals representing at least first, middle and last portions of the pattern period;

sampling the input signal, using a signal sampling means, at a predetermined rate to obtain a sequence of sampled input signals;

generating subwindow accumulation values using a subwindow accumulating means by correlating a predetermined number of sampled input signal values with the reference signal pattern generated during the corresponding subwindow time intervals;

storing sequentially, in a plurality of registers, the subwindow accumulation values associated with the first, middle and last portions of the observation window;

generating weighted subwindow accumulation values using a subwindow weighting means to weight the stored subwindow accumulation values corresponding to the first and last portions of the observation window with a first weighting value, and by further weighting the stored subwindow accumulation values corresponding to the middle portion with at least a second weighting value;

generating a total correlation sum value using an summing means to sum the stored weighted subwindow accumulation values generated during the observation window;

comparing with a comparing means the total correlation sum value generated to a predetermined threshold value, and in response thereto, generating a tone detection signal indicating the detection of the desired tone when the total correlation sum value exceeds the predetermined threshold value.

In accordance with a first embodiment of the present invention, a tone detector for detecting the presence of at least one desired tone of a plurality of tones in an input signal, comprises timing means, phase reference signal generating means, decoder means, sampling means, subwindow accumulating means, summing means, absolute value generating means, combining means and comparing means. The timing means generates timing signals at a predetermined rate. The phase reference signal generating means is responsive to the timing signals for generating a phase reference signal having a period representative of the desired tone frequency. The decoder means is coupled to the phase reference signal generating means and responsive to the phase reference signals being generated, for generating a pair of quadrature phase reference signals comprising a sequence of time intervals representing a predetermined number of phase subregions within the desired tone period. The quadrature phase reference signals generated within the phase subregions have phase amplitude values generated in a predetermined order from at least four predetermined amplitude values. The sampling means is coupled to the input signal and is responsive to the timing signals for sampling the input signal to obtain a sequence of sampled input signals. The sampled input signal values generated are distributed within the phase subregions in accordance with the predetermined sampling rate. The subwindow accumulating means is coupled to the sampling means and the decoder means for multiplying the sampled input signal values by the pair of quadrature phase amplitude signal values generated within the corresponding phase subregion to generate first and second correlation product values. The summing means is coupled to the subwindow accumulating means for summing separately a predetermined number of the first and second correlation product values to generate first and second correlation sum values. The absolute value generating means is coupled to the summing means for obtaining absolute values of the first and second correlation sum values. The combining means combines in a predetermined manner the absolute values of the first and second correlation sum values to generate a total correlation sum value. The comparing means is coupled to the combining means for comparing the total correlation sum value to a predetermined threshold value, and in response thereto, generates a detection signal indicating the detection of the desired tone when the total correlation sum value generated exceeds the predetermined threshold value.

In accordance with a second embodiment of the present invention, a tone detector for detecting the presence of at least one desired tone of a plurality of tones in an input signal comprises a timing means, a sampling means, reference signal generating means, subwindow accumulating means, sequential storing means, subwindow weighting means, summing means, and comparing means. The timing means generates timing signals at a predetermined rate. The sampling means is coupled to the signal input and responsive to the timing signals for sampling the input signal to obtain a sequence of sampled input signals. The reference signal generating means is responsive to the timing signals for generating a reference signal pattern having a period representative of the desired tone frequency and which provides an observation window comprising a predetermined number of subwindow time intervals representing at least first, middle and last portions of the pattern period. The subwindow accumulating means is coupled to the reference signal generating means and to the sampling means for accumulating a predetermined number of sampled input signals with the reference signal pattern generated during corresponding subwindow time intervals to generate a sequence of subwindow accumulation values. The means for sequentially storing, stores the subwindow accumulation values generated during the first, middle and last portions of the observation window. The subwindow weighting means is coupled to the storing means for weighting the stored subwindow accumulation values corresponding to the first and last portions of the observation window with a first weighting value, and further for weighting the stored subwindow accumulation values corresponding to the middle portion of the observation window with at least a second weighting value to generate weighted subwindow accumulation values. The summing means is coupled to the subwindow weighting means sums the stored weighting subwindow accumulation values generated during the at least first, middle, and last portions of the observation window to generate a total correlation sum value. The comparing means is coupled to the summing means for comparing the total correlation sum value generated to a predetermined threshold value and in response thereto for generating a detection signal indicating the detection of the desired tone when the total correlation sum value exceeds the predetermined threshold value.

In response to a third aspect of the present invention, a selective call receiver comprises a receiver, a tone decoder and an alerting means. The receiver receives selective call message signals including at least one desired tone signal designating the receiver to which a message is directed to provide an input signal to the tone decoder. The tone decoder is coupled to the receiver and comprises timing means, phase reference signal generating means, decoder means, sampling means, subwindow accumulating means, summing means, absolute value generating means, combining means and comparing means. The timing means generates timing signals at a predetermined rate. The phase reference signal generating means is responsive to the timing signals for generating phase reference signals having a period representative of the desired tone frequency. The decoder means is coupled to the phase reference signal generating means and is responsive to the phase reference signals being generated for generating a pair of quadrature phase reference signals comprising a sequence of time intervals representing a predetermined number of phase subregions within the desired tone period. The quadrature phase reference signals generated within the phase subregions have phase amplitude values generated in a predetermined order from at least four predetermined amplitude values. The sampling means is coupled to the input signal and responsive to the timing signals for sampling the input signal to obtain a sequence of sampled input signals. The sampled input signal values generated are distributed within the phase subregions in accordance with the predetermined sampling rate. The subwindow accumulating means is coupled to the sampling means and the decoder means for multiplying the sampled input signal values by the pair of quadrature phase amplitude signal values generated within the corresponding phase subregion to generate first and second correlation product values. The summing means is coupled to the subwindow accumulating means for summing separately a predetermined number of the first and second correlation product values to generate first and second correlation sum values. The absolute value generating means is coupled to the summing means for obtaining absolute values of the first and second correlation sum values. The combining means combines in a predetermined manner the absolute values of the first and second correlation sum values to generate a total correlation sum value. The comparing means is coupled to the combining means for comparing the total correlation sum value to a predetermined threshold value and in response thereto generates a detection signal indicating the detection of the desired tone when the total correlation sum value generated exceeds the predetermined threshold value. The alerting means is responsive to the detection signal for generating a sensible alert indicating the reception of the message directed to the selective call receiver.

In accordance with a fourth aspect of the present invention, a selective call receiver comprises a receiver, a tone decoder and an alerting means. The receiver receives selective call message signals including at least one desired tone signal designating the receiver to which a message is directed to provide an input signal to the tone decoder. The tone decoder is coupled to the receiver and comprises timing means, reference signal generating means, sampling means, subwindow accumulating means, weighting means and comparing means. The timing means generates timing signals at a predetermined rate. The reference signal generating means is responsive to the timing signals for generating reference signals having a period representative of the desired tone frequency, and which provides an observation window comprising a predetermined number of subwindow time intervals representing at least first, middle and last portions of the time period. The sampling means is responsive to the timing signals for sampling the input signal to obtain a sequence of sampled input signals during the at least first, middle and last portions of the observation window. The subwindow accumulating means is coupled to the reference signal generating means and to the sampling means for accumulating a predetermined number of sampled input signals with the reference signal pattern generating during corresponding subwindow time intervals to generate a sequence of subwindow accumulation values. The weighting means is coupled to the subwindow accumulating means for weighting the subwindow accumulation values corresponding to the first and last portions of the observation window with a first weighting value and to the subwindow accumulation values corresponding to the middle portion of the observation window with at least a second weighting value. The summing means is coupled to the weighting means for summing the stored weighted subwindow accumulation values generated during the at least first, middle, and last portions of the observation window to generate a total correlation sum value. The comparing means is coupled to the summing means for comparing the total correlation sum value generated to a predetermined threshold value, and in response thereto, generates a detection signal indicating the detection of the desired tone when the total correlation sum value exceeds the predetermined threshold value. The alerting means is responsive to the detection signal for generating a sensible alert indicating the reception of the message directed to the selective call receiver.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

FIG. 1B is an electrical block diagram showing a prior art analog tone detector.

FIG. 2 is a pictorial representation of the prior art sampling window.

FIG. 3 is a pictorial representation of a second prior art sampling window.

DESCRIPTION OF THE PREFERRED EMBODIMENTS

Figure 5:
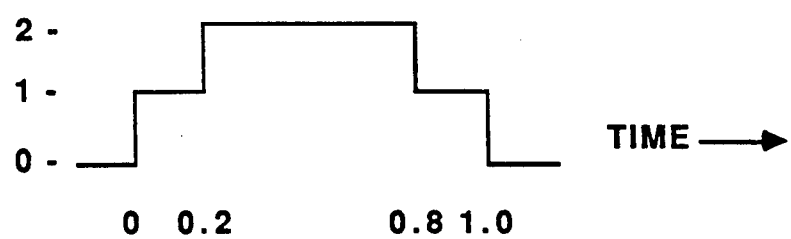
FIG. 5 is a pictorial representation of the "stepped" sampling window utilized in the digital tone detector of the present invention.

With respect to the figures, FIGS. 5-17 illustrate the preferred embodiment of a digital pseudo continuous tone detector providing reduced sidelobe and harmonic responses. In particular, FIG. 5 is a pictorial representation of the window, or weighting, function utilized in the preferred embodiment of the present invention. The observation window provided by the weighting function shown in FIG. 5, unlike that of the prior art, is segmented into at least five subwindows, or subwindow intervals, and provides a "stepped" window function having a first weighting value of +1.0 within the subwindow intervals corresponding to 0–0.2, and 0.8–1.0 of the total correlation interval, or window. During the subwindow interval corresponding to 0.2–0.8 of the total window time interval, a second weighting value of the window function is +2. In the instance where five subwindows are utilized, as in the preferred embodiment of the present invention, each is equal to one-fifth, or twenty per cent of the total observation time interval. It will be appreciated from the description to follow, that other subwindow combinations can be utilized to form the "stepped" window function, such as providing multiple subwindows per window segment, which is especially beneficial when very narrow tone detector bandwidths are required, as will be described in detail below.

FIGS. 6A and 6B show pictorial representations of the digital pseudo sinusoidal reference signals SIN (Wt)

and COS (Wt) utilized in the preferred embodiment of the present invention. As can be seen from FIG. 6, the sine, SIN (Wt), and cosine, COS (Wt), references take on one of four signal amplitude values (1, 2, −1 or −2) depending upon which one of a sequence of eight phase subregions, or octants within the reference cycle the data sample is taken, resulting in a sequence of phase reference amplitude values. Thus, at each sampling instant, a sine and cosine reference value is selected from one of the four values (1, 2, −1 or −2) and added or subtracted from the respective sine and cosine accumulations based upon the sampled input data as will be described in further detail below.

Figure 7:
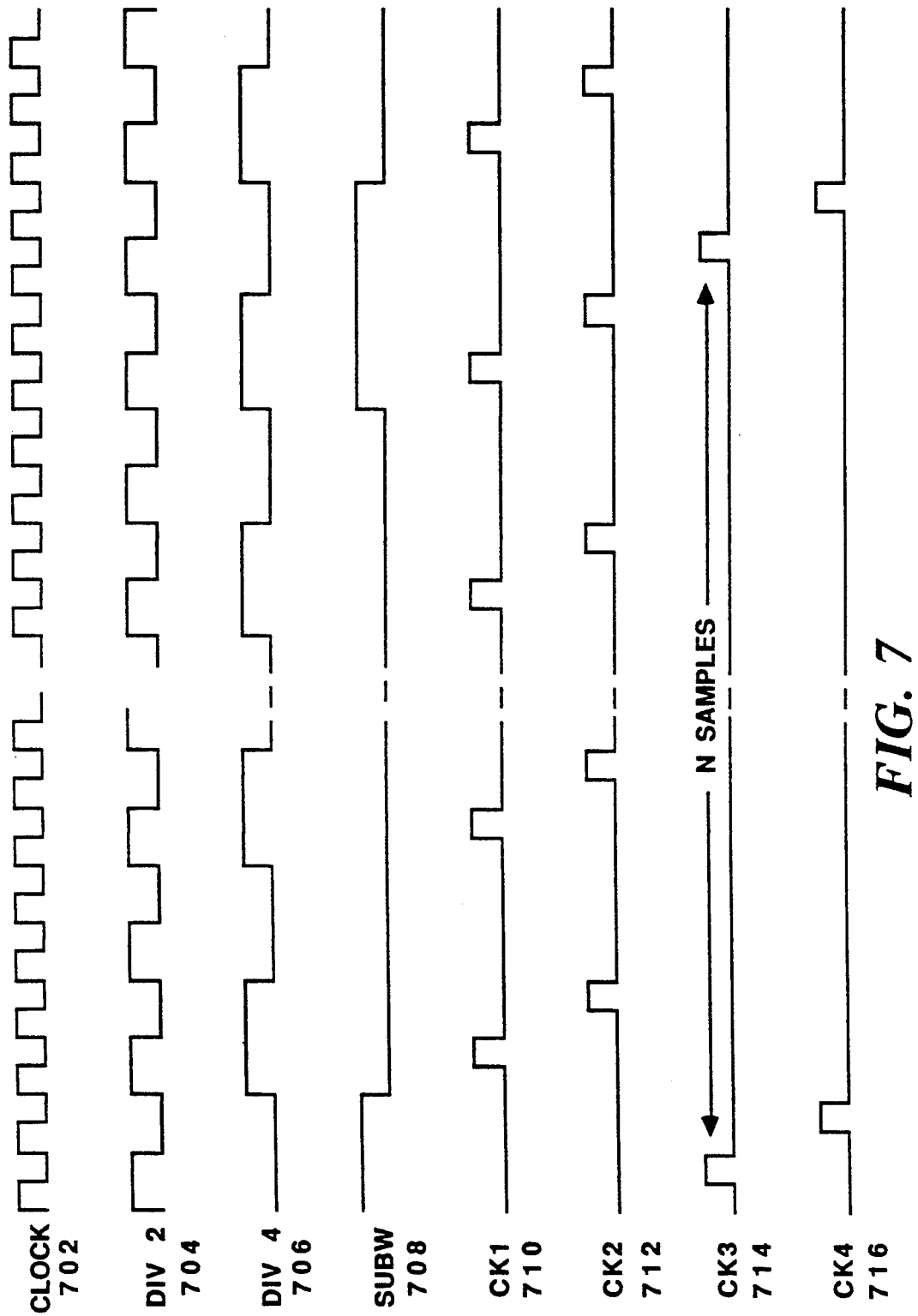
FIG. 7 is a timing diagram depicting the essential timing signals for the digital tone detector of the present invention.

A timing diagram of the operation of the pseudo continuous tone detector of the present invention is shown in FIG. 7. A clock signal 702 is generated which is coupled to a well known divider circuit to generate a divide-by-two, DIV 2 704, and divide-by-four, DIV 4 706 timing signals. The DIV 2 and DIV 4 timing signals are utilized to generate four phase clock reference signals CK1 710, CK2 712, CK3 714 and CK4 716, in a manner well known to one of skill in the art. The divider circuit also generates a subwindow signal 708, once for every $N_s$ cycles of the four phase clock, which controls the generation of the CK3 714 and CK4 716 clock reference signals. As can be seen from FIG. 7, clock reference signals CK1 710 and CK2 712 are continuously generated, whereas clock reference signals CK3 714 and CK4 716 are generated only once during each sampling subwindow comprising $N_s$ sampling pulses, as shown.

Figure 8A:
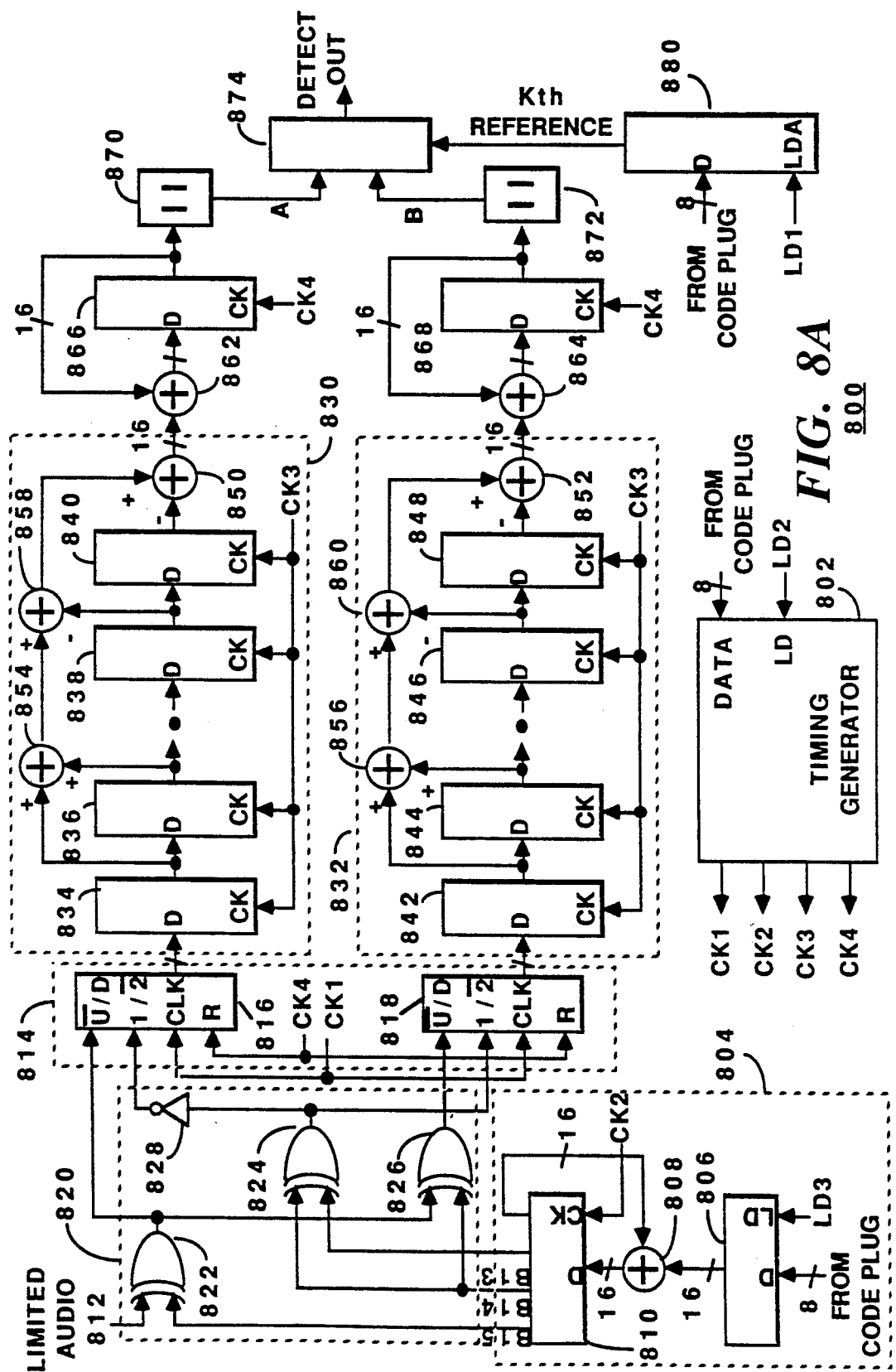
FIGS. 8A and 8B are electrical block diagrams showing the hardware implementation of the digital tone detector of the present invention.
Figure 8B:
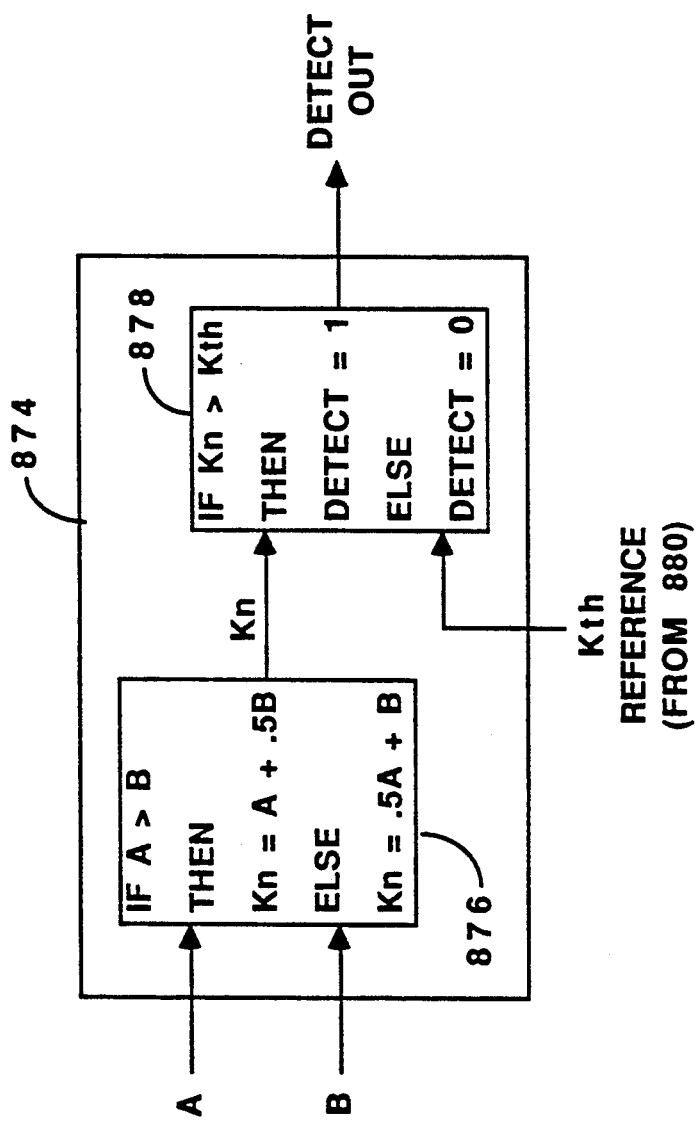

FIGS. 8A and 8B are electrical block diagrams illustrating the hardware implementation of the pseudo continuous tone detector 800 of the present invention. A combined hardware and microcomputer implementation, and a complete microcomputer implementation of the pseudo continuous tone detector will also be described in detail below.

In the preferred embodiment of the present invention, the hardware implementation of the pseudo continuous tone detector is intended to preferably be processed as a custom integrated circuit in one of a number of well known CMOS integrated circuit technologies. However, for purposes of providing a complete description, the hardware implementation of the pseudo continuous tone decoder will be described referencing one of a number of well known discrete integrated circuit families, such as the 74HCxxx CMOS integrated circuit family manufactured by Motorola Inc.

Referring to FIG. 8A, a timing means, such as timing generator 802, generates all of the clock reference signals CK1, CK2, CK3 and CK4 necessary for operation of the pseudo continuous tone detector, as described above. A crystal controlled oscillator (not shown) preferably generates a clock signal at substantially 76.8 kilohertz (KHz). Clock reference signals CK1 and CK2 are continuously generated, as described above, to provide a 19.2 KHz sample clock reference signal CK1, and a 19.2 KHz phase increment clock reference signal CK2. Clock reference signals CK3 and CK4 are generated, as described above, only once during each subwindow time interval which corresponds to 192 samples ($N_s=192$) in the preferred embodiment of the present invention.

The sine and cosine reference signals for the pseudo continuous tone detector of the present invention are generated in a phase accumulator 804 comprising a 16 bit phase increment register 806, a 16 bit adder 808, and a 16 bit accumulator 810. The 16 bit phase increment register 806 is preferably constructed using two octal latches (only one of which is shown), such as a 74HC373. The phase increment register 806 is loaded eight bits at a time from a code memory which stores such information as the frequency dependent decoder constants to be described below. The frequency dependent decoder constants define the tones to which the tone detector is responsive. Phase increment register 806 includes a load input LD3 for controlling the loading of the phase increment information at the start of the correlation process for a particular tone. It will be appreciated that the number of bits being loaded at any particular time is a function of the size of the data bus provided to transfer information. When a 16 bit data bus is provided, the phase increment register 806 would be loaded in only one load clock cycle.

The output of the 16 bit phase increment register 806 couples to the input of the 16 bit adder 808. The 16-bit adder 808 is preferably constructed using four 4-bit adders, such as a 74HC283. The 16-bit adder 808 has sixteen data bit inputs coupled from the output of the 16 bit phase increment register 806, and sixteen data bit inputs coupled from the output of the 16 bit accumulator 810. The 16-bit accumulator 810 is preferably constructed using a two clocked, octal D flip flops, such as a 74HC273, to which the contents is periodically updated each time the clock reference signal CK2 is generated. The 16-bit phase incrementer register 806 stores a phase increment (PHINC) value corresponding to the desired tone to be detected. The phase increment value is calculated from the following equation.

$$PHINC = 65,536 \times (F_o/F_s)$$

where 65,536 corresponds to the largest value the accumulator 810 can hold (16 binary bits), $F_o$ is the desired tone frequency to be detected, and $F_s$ is the sampling frequency, which is preferably 19.2 KHz, as described above. The phase increment for the desired tone stored in the phase increment register 806 is added to the previous phase accumulation total held in the phase accumulator 810 by the adder 808 following each sample interval. The summation in the phase accumulator 810 proceeds from 0 to a value of 65,535 and then rolls over. The range 0 to 65,535 constitutes one complete cycle of the reference signal.

The actual operation of the phase accumulator 804 is best understood by way of example. In the example to follow, it is desired to detect a 1000 Hz tone. For a 1000 Hz tone, the phase increment is calculated as described above, $$\begin{aligned} PHINC &= 65,536 \times (1000 \text{ Hz}/19.22\text{KHz}) \\ &= 3413.33 \end{aligned}$$

The computed phase increment is rounded off in the preferred embodiment of the present invention to allow utilizing binary adder functions which do not require floating point computations, thus yielding a phase increment value of 3413. The PHINC value is stored in binary form in the 16 bit phase increment register 806 at the beginning of the tone detection time interval. Table 1 shows partially tabulated phase increment values which would be generated for the detection of a 1000 Hz tone, as the phase accumulator is periodically updated during each sample interval. Table 1 also shows the values of the most significant bits of the phase accumulator 810, bits 13, 14 and 15, which are utilized to determine the octant of the reference signal during which the input data 812 is sampled. Also shown are the corresponding sine and cosine reference signal values, the function of which will become apparent in the description to follow. While the accumulator 810 value is shown as being reset to zero at the start of the phase incrementing cycle, it will be appreciated, in actual operation the accumulator 810 need not be reset at the start of the detection of a new tone. As shown in Table 1, after each data sample is taken, the phase accumulator 810 is updated, adding 3,413 to the previous result stored in phase accumulator 810. Once the count exceeds 65,535, as at phase number 20, the count rolls "over" and continues at the next phase accumulator value, less 65,536, which, in this instance, results in 2,724.

TABLE 1

Phase Accumulator Operation

| Phase Number | Phase Acc | Bit 15 | Bit 14 | Bit 13 | Sine | Cosine |
|---|---|---|---|---|---|---|
| 1 | 0 | 0 | 0 | 0 | −1 | −2 |
| 2 | 3,413 | 0 | 0 | 0 | −1 | −2 |
| 3 | 6,826 | 0 | 0 | 0 | −1 | −2 |
| 4 | 10,239 | 0 | 0 | 1 | −2 | −1 |
| 5 | 13,652 | 0 | 0 | 1 | −2 | −1 |
| 6 | 17,065 | 0 | 1 | 0 | −2 | 1 |
| 7 | 20,478 | 0 | 1 | 0 | −2 | 1 |
| 8 | 23,891 | 0 | 1 | 0 | −2 | 1 |
| 9 | 27,304 | 0 | 1 | 1 | −1 | 2 |
| 10 | 30,717 | 0 | 1 | 1 | −1 | 2 |
| 11 | 34,130 | 1 | 0 | 0 | 1 | 2 |
| . | | | | | | |
| . | | | | | | |
| 19 | 61,434 | 1 | 1 | 1 | 1 | −2 |
| 20 | 64,847 | 1 | 1 | 1 | 1 | −2 |
| 21 | 2,724 | 0 | 0 | 0 | −1 | −2 |
| . | | | | | | |

Figure 1A:
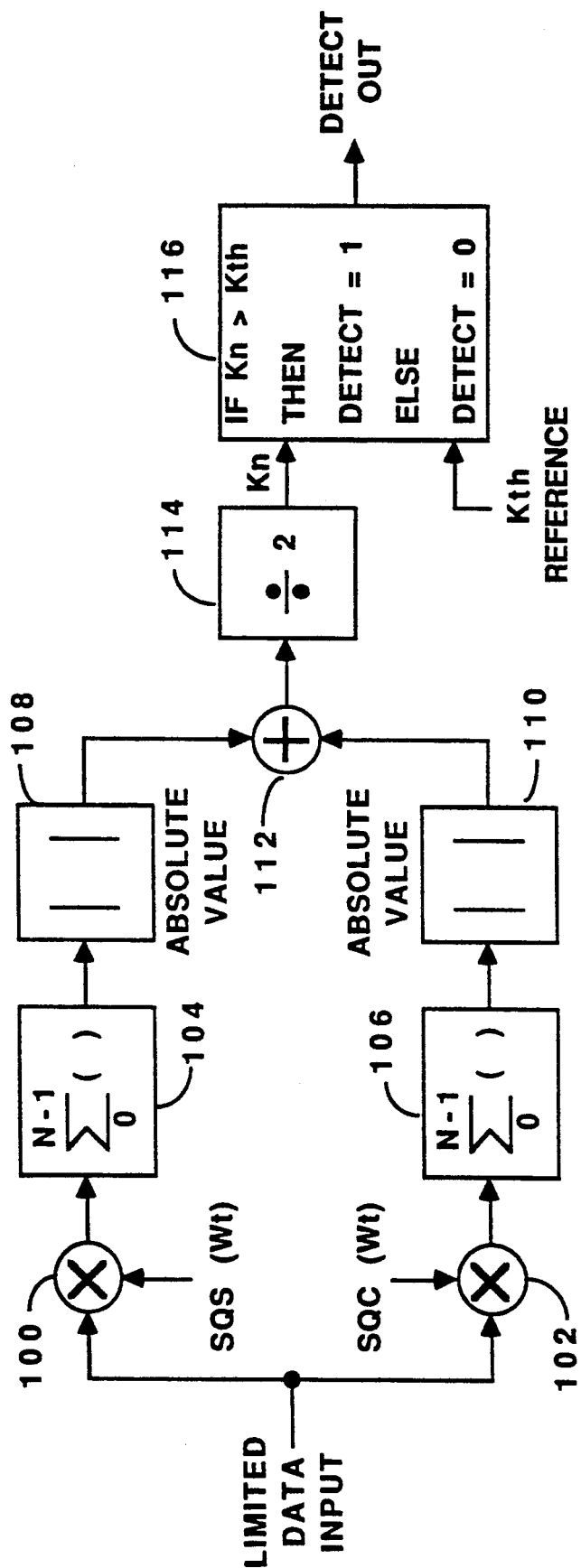
FIG. 1A is an electrical block diagram showing a prior art digital tone detector.
Figure 4:
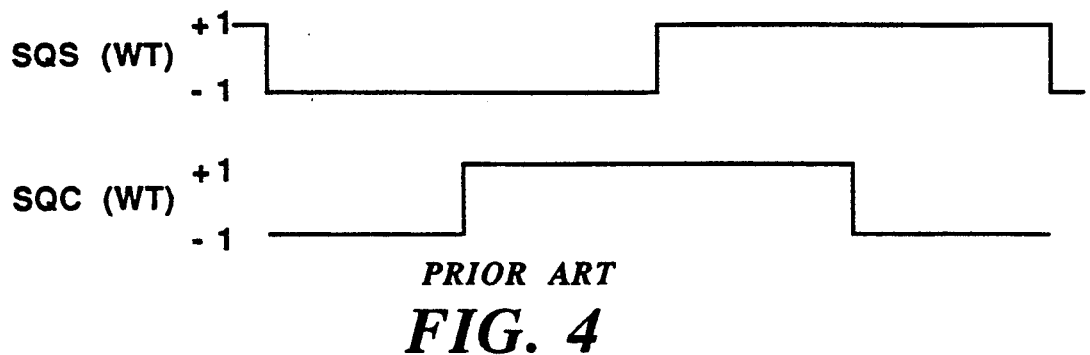
FIG. 4 is a pictorial representation of the prior art quadrature reference signals.

Returning to FIG. 8A, as in the prior art digital tone detectors, limited audio input signals 812 provided by the receiver to the input of the pseudo continuous tone detector of the present invention, take on values of +1 and −1, corresponding to logic 1 and logic 0 levels, respectively, for the tone input to be detected. However, unlike the prior art tone detectors which provided hard limited sine and cosine reference signals, as shown in FIG. 4, having only values of +1 and −1, the pseudo continuous tone detector of the present invention utilizes four level pseudo sinusoidal reference signals, as shown in FIGS. 6A and 6B. The use of the four level sine and cosine approximations reduce the harmonic responses of the detector by approximately 10 dB, as compared to prior art digital tone detectors, which places the harmonic responses approximately 20 dB below the center frequency response of the detector, as is shown and will be described in FIG. 15.

As can be seen from the representations of the sine and cosine functions shown in FIGS. 6A and 6B, the reference signals utilized in the preferred embodiment of the present invention take on one of four values (1, 2, −1 or −2) depending upon which octant within the reference cycle the input data sample is taken. Thus, at each sampling instant, corresponding to each time clock reference signal CK1 is generated, one of the four values (1, 2, −1 or −2) will be selected and added or subtracted based upon the input data 812, from the subwindow accumulation counter 814. Subwindow accumulation counter 814 operates as a sampling means, performing the required sample accumulations using special up/down counters 816, 818, which will be described in detail below, that can either be incremented by 1 or 2, or decremented by 1 or 2 as determined from the input data sample value and the current value of the pseudo sinusoidal reference signals.

TABLE 2

Correlation Decoder Truth Table

| 1 | 2 | 3 | 4 | 5 | 6 | 7 | 8 | 9 | 10 | 11 | 12 | 13 |
|---|---|---|---|---|---|---|---|---|---|---|---|---|
| INPUT | BIT 15 | BIT 14 | BIT 13 | DATA | SIN | COS | SIN | COS | DINSB | SINS1UB | SCOS12B | COSUB |
| 0 | 0 | 0 | 0 | −1 | −1 | −2 | 1 | 2 | 1 | 0 | 0 | 0 |
| 0 | 0 | 0 | 1 | −1 | −2 | −1 | 2 | 1 | 0 | 0 | 1 | 0 |
| 0 | 0 | 1 | 0 | −1 | −2 | 1 | 2 | −1 | 0 | 0 | 1 | 1 |
| 0 | 0 | 1 | 1 | −1 | −1 | 2 | 1 | −2 | 1 | 0 | 0 | 1 |
| 0 | 1 | 0 | 0 | −1 | 1 | 2 | −1 | −2 | 1 | 1 | 0 | 1 |
| 0 | 1 | 0 | 1 | −1 | 2 | 1 | −2 | −1 | 0 | 1 | 1 | 1 |
| 0 | 1 | 1 | 0 | −1 | 2 | −1 | −2 | 1 | 0 | 1 | 1 | 0 |
| 0 | 1 | 1 | 1 | −1 | 1 | −2 | −1 | 2 | 1 | 1 | 0 | 0 |
| 1 | 0 | 0 | 0 | 1 | −1 | −2 | −1 | −2 | 1 | 1 | 0 | 1 |
| 1 | 0 | 0 | 1 | 1 | −2 | −1 | −1 | −2 | 0 | 1 | 1 | 1 |
| 1 | 0 | 1 | 0 | 1 | −2 | 1 | −1 | 2 | 1 | 0 | 1 | 0 |
| 1 | 0 | 1 | 1 | 1 | −1 | 2 | −1 | 2 | 1 | 1 | 0 | 0 |
| 1 | 1 | 0 | 0 | 1 | 1 | 2 | 1 | 2 | 1 | 0 | 0 | 0 |
| 1 | 1 | 0 | 1 | 1 | 2 | 1 | 2 | 1 | 0 | 0 | 1 | 0 |
| 1 | 1 | 1 | 0 | 1 | 2 | −1 | 2 | −1 | 0 | 0 | 1 | 1 |
| 1 | 1 | 1 | 1 | 1 | 1 | −2 | 1 | −2 | 1 | 0 | 0 | 1 |

The direction of the subwindow accumulation, either up or down, and the magnitude of the change is determined by a decoder 820 comprising exclusive-or gates 822, 824 and 826, and inverter 828 which use as inputs the three most significant bits of the phase accumulator 410 and the incoming limited audio data 812. The decoder 820 is preferably constructed using a quad exclusive-or gate, such as a 74HC86, and an inverter, such as a 74HC02. The truth table for the decoder is tabulated in Table 2 above.

As shown in Table 2, column 1 shows the logic levels for the limited data input signal. Columns 2, 3 and 4 show the possible logic levels obtained for the three most significants bits, bit 15, bit 14 and bit 13 of the phase accumulator 810 as the phase increment PHINC is added to the phase accumulator. Column 5 shows the bipolar data values derived from the logic levels of column 1. Columns 6 and 7 show the bipolar data values for the pseudo sinusoidal reference signals derived from the logic levels of columns 2, 3 and 4. The product of the data of column 5 and the pseudo sinusoidal reference values of columns 6 and 7 are shown in columns 8 and 9. Columns 10-13 show the correlation decoder outputs which drive the subwindow accumulation counter 814. In particular, the output of exclusive-or 822, values of which are shown in column 11, couples to the up/down input of special counter 816 and further to one of the inputs of exclusive-or 826. The output of exclusive-or 824, values of which are shown in column 12, couples to the ½-bar input of special counter 818 and to the input of inverter 828. The output of inverter 828, values of which are shown in column 10, couples to the ½-bar input of special counter 816. The output of exclusive-or 826, values of which are shown in column 13, couples to the up/down input of special counter 818.

Clock reference signal CK1, which couples to the clock input of special counters 816 and 818, clocks the special counters 816 and 818, to be described below, to effect sampling of the limited data input signal, resulting in incrementing or decrementing subwindow accumulator counter 814 by values of 1 or 2 based on the control inputs defined in Table 2. As for example, when the input corresponds to a logic zero, and the most significant bits of phase accumulator 810 have logic values of, zero, zero and zero, respectively, the data value of the input signal corresponds to a $-1$, while the sine and cosine values corresponds to values of $-1$ and $-2$, respectively. The product of the sine value and the input (DSIN) becomes 1, while the product of the cosine value and the input (DCOS) becomes 2. A logic 1 level is generated at the ½-bar input of special counter 816, and a logic 0 level is generated at the UP-bar/DN input input of special counter 816, resulting in an increment of plus 1 to be made to the sine quadrature component counter, as will be described in detail below. A logic 0 level is generated at the ½-bar input of special counter 818, and a logic 0 level is generated at the UP-bar/DN input input of special counter 818, resulting in an increment of plus 2 be made to the cosine quadrature component counter, as will also be described in detail below.

As in the prior art digital tone detectors, the incrementing and decrementing of the up/down counters proceeds for $N_S$ samples, the length of one subwindow. In the preferred embodiment of the present invention, the length of the special counters 816 and 818 are four times the number of samples taken during each particular subwindow time interval, to account for the sign bit and the fact that some samples are multiplied by 2, which implies that ten bit up/down counters be used to accumulate up to 256 samples without overflow.

Figure 9:
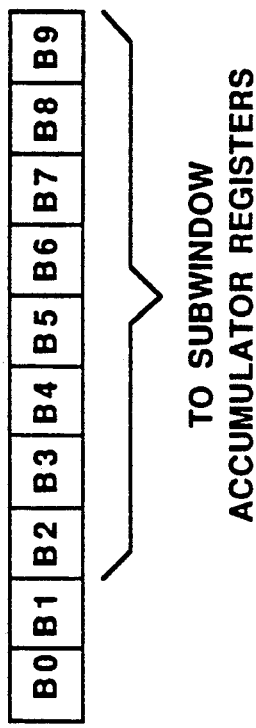
FIG. 9 is a pictorial representation of the data generated in the up/down, increment by $\frac{1}{2}$ counter utilized in the digital tone detector of the present invention.

The output of the special counters 816 and 818 couple to a storing means and multiplying, or weighting means 830 and 832, respectively. The storing means and weighting means 830 and 832, each comprise M+1 registers 834-840 together with adders 850, 854, and 858, and M+1 registers 842-848 together with adders 852, 856 and 860, respectively. M is the number of subwindows comprising the total observation window length. Registers 834-840 and 842-848 are preferably octal D-type shift register, such as a 74HC273 which are used to hold the previous M+1 subwindow accumulations. Since the output of the special counters and 818 are ten bits, while the subwindow accumulator registers are only eight bits, only the eight most significant bits of each new subwindow accumulation is stored in each of the registers, in the preferred embodiment of the present invention, as shown in FIG. 9. Truncating the two least significant bits allows the use of standard octal registers and simplifies the mathematics required, as described below. At the end of a subwindow accumulation which is determined by the generation of clock reference signal CK3, the eight most significant bits of the up/down counters 816 and 818 are shifted respectively into register 834 and 842, and the contents of register 834 and 842 respectively are shifted into register 836 and 844, and so on.

As the subwindow accumulator registers 834-840 and 842-848 are shifted, a new correlation sum is computed and stored in registers 866 and 868, respectively. The correlation sum is computed significantly differently, compared to the prior art digital tone detectors, in order to account for the "stepped" window response shown in FIG. 5. FIG. 5 indicates that the sample accumulations occurring in the first and last portions of the window are multiplied by a weighting factor of 1, and the middle, or center, portion of the sample accumulations are multiplied by 2. Thus, the subwindow accumulation registers 834-840 and 842-848, together with adders 854 and 858, 856 and 860, and 850 and 852 provide a multiplying means for multiplying the sampled subwindow accumulations appearing during the first and last portions of the "stepped" window function by a first value of "1", and further for multiplying the middle portion by a second value of "2". When the step length is made equal to approximately one fifth the total correlation window length, as shown in FIG. 5, the sidelobes of the correlation filter response are reduced by more than 6 dB, as compared to the prior art digital tone detectors which utilized the rectangular window of FIG. 2. This improvement is shown and described in FIGS. 13 and 14 below. Returning to FIG. 8A, this improvement is, however, at the expense of broadening the main lobe response. To compensate for the "broadening" of the main lobe response, the total observation window is increased, which implies increasing the number of samples taken, as compared to the prior art digital tone detectors. As an example, the prior art digital tone detectors which use a rectangular window, requires ten subwindows of 154 samples to provide a main lobe to the first zero crossings center frequency bandwidth of 12 Hz. In the "stepped" window implementation of the present invention, ten subwindows of 192 samples are required to produce the same results.

Returning to FIG. 8A, the calculation of the correlation sum is performed by adding with adders 850 and 852 the newest subwindow accumulations present at the outputs of registers 834 and 842, and subtracting off the oldest subwindow accumulation present at the outputs of registers 840 and 848, respectively, as in the prior art digital tone detectors. Adders 850 and 852 are preferably implemented utilizing four 4-bit adders, such as 74HC283 4-bit adders, which have been connected to form a 16 bit adder function. However, the newest subwindow accumulation present at the output of registers 834 and 842 do not include the calculation required to compensate for the use of the "stepped" window function. This calculation is accomplished by adding the newest subwindow accumulation that has advanced into the double weighted step region of the window function, and subtracting off the subwindow accumulation that has advanced into the trailing singly weighted step region. As previously described, by adding the newest subwindow accumulation that has advanced past the leading singly weighted step, the subwindow totals in the center portion of the window are multiplied by 2. This is accomplished in the preferred embodiment of the present invention by adding the newest subwindow accumulations present at the outputs of registers 834 and 842 with the accumulations present at the outputs of registers 836 and 844 in adders 854 and 856, respectively. Adders 854 and 856 are also preferably implemented utilizing four 4-bit adders, such as 74HC283 4-bit adders, which have been connected to form a 16 bit adder function, as are adders 858 and 860, the function of which is to be described in detail below. By subtracting off the subwindow accumulation that has advanced past the trailing step, the subwindow totals in the trailing portion of the window are multiplied by 1. This is accomplished in the preferred embodiment of the present invention by subtracting off the the next to the last subwindow accumulation present at the output of registers 838 and 846 from the subtotal subwindow accumulations present at the output of adders 854 and 856 in adders 858 and 860, respectively. As an example, for the pseudo sinusoidal tone detector shown in FIG. 8A, when the total observation period is defined as having five subwindow intervals (M=5), the leading and trailing steps are only one subwindow interval in length, while the center subwindow portion is three subwindow intervals in length. Consequently, the newest subwindow accumulation is present in registers 834 and 842. The registers on the leading edge of the step are registers 836 and 844 which are added into the correlation total. The oldest register, registers 840 and 848, and the registers on the trailing edge of the step, registers 838 and 846 are subtracted from the correlation total in adders 858 and 860, and adders 850 and 852, respectively. In this manner, a very simple and efficient mechanism is provided for generating the stepped window function, which can be extended to any number of subwindow intervals, preferably meeting the criterion of the first and last steps being 1/5 the total window length, such as, but not limited to, ten, fifteen and other multiples of five subwindow intervals.

To complete the computations, the accumulations present at the outputs of adders 850 and 852, which represent the difference in the correlation sums resulting from the shifting of the current, or newest subwindow accumulations into registers 834–840 and 842–848, respectively, are added into the correlation sums stored in registers 866 and 868 by adders 862 and 864, respectively, which then store the most recent total correlation sum back into registers 866 and 868, respectively. This total correlation sum includes the results determined by the use of pseudo sinusoidal reference signals and the "stepped" window function. In particular, special register 816, registers 834–840 and 866, and adders 850, 854, 858 and 862 perform the calculations in the sine quadrature branch of the pseudo sinusoidal tone detector. Special register 818, registers 842–848 and 868, and adders 852, 856, 860 and 864 perform the calculations in the cosine quadrature branch of the pseudo sinusoidal tone detector.

The total correlation sums present at the outputs of registers 866 and 868 are further processed by absolute value circuits 870 and 872, respectively. Absolute value circuits 870 and 872 perform a two's complement function for the negative numbers in a manner well known in the art, thereby converting any negative total correlation sum into a positive total correlation sum.

The outputs of absolute value circuits 870 and 872 couple to the input of the detector correlation circuit 874, which is shown in further detail in FIG. 8B. Unlike the prior art digital tone detectors which compared the final correlation sum of both quadrature branches with a predetermined reference threshold $K_{th}$, the total correlation sum in the preferred embodiment of the present invention is found by first combining the larger of the two absolute values at the output of absolute value circuits 870 and 872, found in the two quadrature branches to ½ the smaller of the two values, as shown in FIG. 8B. Thus, when the absolute value (A) of the total correlation sum of the sine quadrature branch is greater then the absolute value (B) of the total correlation sum of the cosine quadrature branch, the total correlation sum is found by combining means 876 as $K_n = A + 0.5B$. When the absolute value (A) of the total correlation sum of the sine quadrature branch is less then the absolute value (B) of the total correlation sum of the cosine quadrature branch, the total correlation sum is found by combining means 876 as $K_n = 0.5A + B$. This summation rule generated by combining means 876 provides a correlation sum that is independent of the phase of the incoming data signal with respect to the pseudo sinusoidal reference signals, provided that an equal number of samples are taken in each of the eight octants of the pseudo sinusoidal reference signals, as in the prior art digital tone detectors. After the computation of the total correlation sum, $K_n$, in summing circuit 876, the total correlation sum, $K_n$, is compared with the reference threshold $K_{th}$, in threshold comparing means 878 to determine when a tone is present, just as in the prior art digital tone detectors. Implementations of combining means 876 and the comparing means 878, are well known to one of ordinary skill in the art, especially when such computation can be performed utilizing a microcomputer, as will be described in detail below. The $K_{th}$ reference signal is stored in register 880, and is varied depending upon the tone frequency, as will be described in detail below.

Determination of the maximum value of the correlation sum obtainable during the total window sampling time depends upon a number of factors, in particular, the number of samples taken during each subwindow time interval, a multiplying factor of one fourth (since only the eight most significant bits of the ten bit up-/down counters are used), the average of the absolute value of the reference signal (1.5), the number of subwindows within the total correlation window time interval, and the "stepped" window weighting function (the area under the window function (1.6). For example, when the number of samples equal 192 and when the number of subwindows equal 5, the maximum correlation value equals 192 * 0.25 * 1.5 * 5 * 1.6 = 576. Maximum correlation sums for a number of window lengths representative of the values used in typical two tone decoding applications are tabulated in Table 3, below.

TABLE 3

| Representative Maximum Correlation Sums | | | | |
|---|---|---|---|---|
| Number of Subwindows | Step Width | Number of Samples | Maximum Correlation Value | Threshold −11.0 dB |
| 20 | 4 | 192 | 2304 | 650 |
| 15 | 3 | 192 | 1728 | 487 |
| 10 | 2 | 192 | 1152 | 325 |
| 5 | 1 | 192 | 576 | 162 |

As can be seen from Table 3, for the case where the total correlation window is separated into five subwindows, each having a single step width of 192 samples, the maximum correlation value, or sum $K_n$, which would be computed would be 576. In order to provide tone detection at low signal to noise ratios as would occur when the invention is coupled to a radio receiver, threshold values of around −11.0 dB are required. A threshold value of −11.0 dB corresponds to a $K_{TH}$ of 162.

For a step width of 1/5 which is preferable in the preferred embodiment of the present invention, as described above, the formula for the computation of the maximum correlation sum is as follows:

*Max. Correlation Value* $= 0.6 * Ns * M$ where
Ns = the number of samples per subwindow and M = the number of subwindows Thus for Ns = 192 samples and M = 5 subwindows, the maximum correlation value would be 576 as shown in Table 3 above.

The threshold value is determined using the maximum correlation value determined above and is calculated as follows:

$$K_{th} = K_n * 10^{(Threshold\,(dB)/20)}$$

where $K_{th}$ is the calculated threshold value, $K_n$ is the maximum correlation value, and $10^{(Threshold\,(dB)/20)}$ is the antilog of the desired threshold value in dBs divided by 20.

Figure 10A:
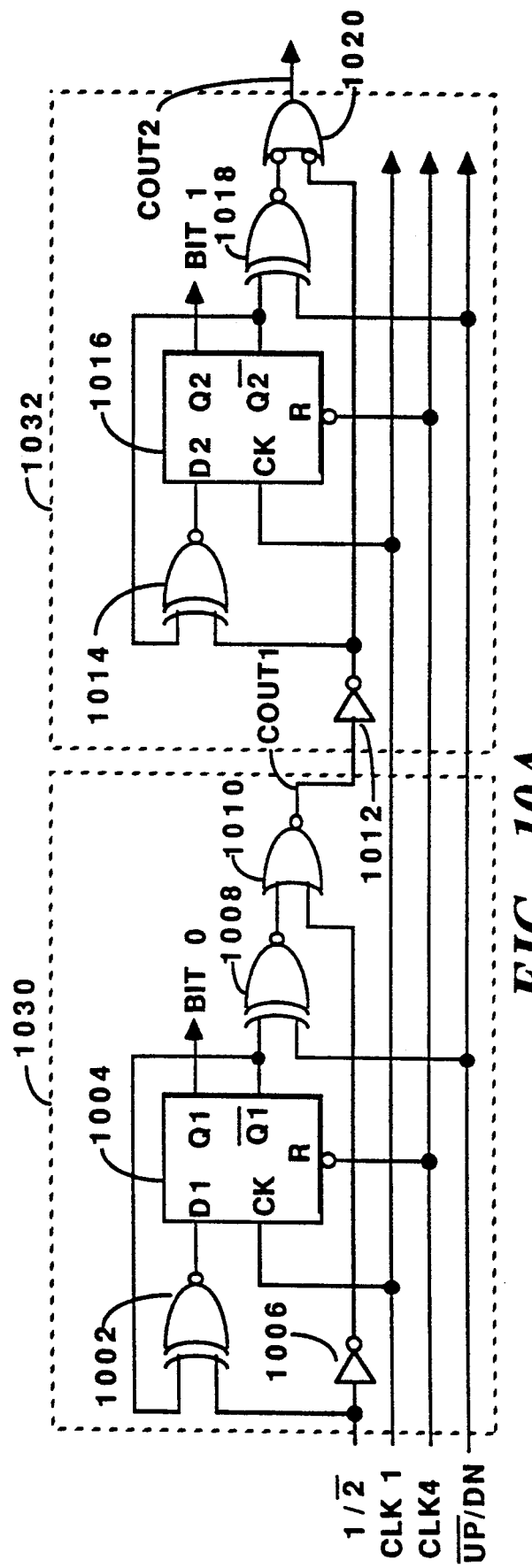
FIG. 10A is an electrical schematic diagram of the up/down, increment $\frac{1}{2}$ counter utilized in the digital tone detector of the present invention.

FIG. 10A is an electrical logic diagram of the first two stages of the special counter used in the subwindow accumulation counters of the present invention. The operation of the special counter shown in FIG. 10A is best understood by means of the truth table of Table 4, below.

TABLE 4

| | | | | | | | | | | | | | |
|---|---|---|---|---|---|---|---|---|---|---|---|---|---|
| Special Up/Down Counter Truth Table | | | | | | | | | | | | | |
| INPUTS | | PRESENT STATE | | | | | | NEXT STATE | | | | | |
| $\bar{\tfrac{1}{2}}$ | U/D | Q1 | Q2 | D1 | D2 | $\overline{C1}$ | $\overline{C2}$ | Q1 | Q2 | D1 | D2 | $\overline{C1}$ | $\overline{C2}$ |
| 1 | 1 | 0 | 0 | 1 | 0 | 1 | 1 | 1 | 0 | 0 | 1 | 0 | 1 |
| 2 | 1 | 0 | 1 | 0 | 0 | 1 | 0 | 1 | 0 | 1 | 1 | 1 | 1 |
| 3 | 1 | 0 | 0 | 1 | 1 | 1 | 1 | 1 | 1 | 1 | 0 | 0 | 0 | 0 |
| 4 | 1 | 0 | 1 | 1 | 0 | 0 | 0 | 0 | 0 | 0 | 1 | 0 | 1 | 1 |
| 5 | 0 | 0 | 0 | 0 | 0 | 1 | 0 | 1 | 0 | 1 | 0 | 0 | 0 | 0 |
| 6 | 0 | 0 | 1 | 0 | 1 | 1 | 0 | 1 | 1 | 1 | 1 | 0 | 0 | 0 |
| 7 | 0 | 0 | 0 | 1 | 0 | 0 | 0 | 0 | 0 | 0 | 0 | 1 | 0 | 1 |
| 8 | 0 | 0 | 1 | 1 | 1 | 0 | 0 | 0 | 1 | 0 | 1 | 1 | 0 | 1 |
| 9 | 1 | 1 | 0 | 0 | 1 | 1 | 0 | 0 | 1 | 1 | 0 | 1 | 1 | 1 |
| 10 | 1 | 1 | 1 | 0 | 0 | 0 | 1 | 1 | 0 | 0 | 1 | 1 | 0 | 0 |
| 11 | 1 | 1 | 0 | 1 | 1 | 0 | 0 | 1 | 1 | 0 | 0 | 0 | 1 | 1 |
| 12 | 1 | 1 | 1 | 1 | 0 | 1 | 1 | 1 | 0 | 1 | 1 | 0 | 0 | 1 |
| 13 | 0 | 1 | 0 | 0 | 0 | 1 | 0 | 0 | 0 | 1 | 0 | 0 | 0 | 1 |
| 14 | 0 | 1 | 1 | 0 | 1 | 1 | 0 | 0 | 1 | 1 | 1 | 0 | 0 | 1 |
| 15 | 0 | 1 | 0 | 1 | 0 | 0 | 0 | 1 | 0 | 0 | 0 | 1 | 0 | 0 |
| 16 | 0 | 1 | 1 | 1 | 1 | 0 | 0 | 1 | 1 | 0 | 1 | 1 | 0 | 0 |

FIG. 10A is an electrical block diagram of the special counter utilized in the subwindow accumulation counters of the present invention. Special counter 1000 provides two important functions required to process the pseudo sinusoidal reference signals utilized in the present invention: counting up by one and by two and counting down by one and by two. Operation of special counter 1000 is best understood by reference to FIG. 10A in conjunction with Table 4 which shows the truth table showing the operation of the special counter.

Four signals are utilized to control the operation of the special counter 1000. These signals include the count 1/count 2 ($\tfrac{1}{2}$-bar) input, the count up/count down (UP-bar/DN) input, a reset input (CK4) and the sample clock (CK1). When the $\tfrac{1}{2}$-bar input is set to a logic 1 level, special counter 1000 counts by one; and when the $\tfrac{1}{2}$-bar input is a logic 0 level, special counter 1000 counts by two. When the UP-bar/DN input is set to a logic zero, special counter 1000 will count up; and when the UP-bar/DN input is a logic 1 level, special counter 1000 will count down.

The operation of special counter 1000 will be described using two of the possible sixteen conditions shown in Table 4, condition 1 and condition 16. When special counter 1000 is operating as shown in condition 1, the $\tfrac{1}{2}$-bar input is a logic 1 level, and the UP-bar/DN input is a logic 0 level, indicating the counter will count up by one. As shown in Table 4 for condition 1, both D FLIP-FLOP 1004 and D FLIP-FLOP 1016 have been reset, indicating a value of zero. A logic 1 level is coupled from the $\tfrac{1}{2}$-bar input to one input of EXCLUSIVE-NOR 1002; and also to the input of INVERTER 1006 resulting in a logic 0 level output from INVERTER 1006. The second input of EXCLUSIVE-NOR 1002, which couples to the Q-bar output of D FLIP-FLOP 1004 is a logic 1 level, since D FLIP-FLOP 1004 was reset, resulting in a logic 1 level at the output of EXCLUSIVE-NOR 1002 which couples to the data (D1) input of D FLIP-FLOP 1004. The Q-bar output of D FLIP-FLOP 1004 also couples to an input of EXCLUSIVE-NOR 1008. The second input to EXCLUSIVE-NOR 1008 is coupled to the UP-bar/DN input which is presently a logic 0 level, resulting in a logic 0 output from EXCLUSIVE-NOR 1008 which couples to one input of NOR 1010. The second input to NOR 1010 couples to INVERTER 1006 which is presently a logic 0 level resulting in a logic 1 level output from NOR 1010, which couples to the input of INVERTER 1012, resulting in a logic 0 level output from INVERTER 1012. The output from NOR 1010 provides the carry output (COUT1) from the first stage of the special counter 1000.

The logic 0 level from INVERTER 1012 couples to one input of EXCLUSIVE-NOR 1014 and to the first input of NAND 1020. The second input of EXCLUSIVE-NOR 1014, which couples to the Q-bar output of D FLIP-FLOP 1016 is a logic 1 level, since D FLIP-FLOP 1016 was reset, resulting in a logic 0 level at the output of EXCLUSIVE-NOR 1014 which couples to the data (D2) input of D FLIP-FLOP 1016. The Q-bar output of D FLIP-FLOP 1016 also couples to an input of EXCLUSIVE-NOR 1018. The second input to EXCLUSIVE-NOR 1018 is coupled to the UP-bar/DN input which is presently a logic 0 level, resulting in a logic 0 output from EXCLUSIVE-NOR 1018 which couples to the second input of NAND 1020. Since the first input to NAND 1020 is presently a logic 0 level, a logic 1 level output is obtained from NAND 1020. The output from NAND 1020 provides the carry output (COUT2) from the second stage of the special counter 1000.

Upon the next sample clock CK1, the Q1 output of D FLIP-FLOP 1004 becomes a logic 1 level because of the logic 1 level at the input of D FLIP-FLOP 1004. The Q1-bar output of D FLIP-FLOP 1004 then becomes a logic 0 level which couples to the input of EXCLUSIVE-NOR 1002, which together with the logic 1 level present at the second input, results in a logic 0 level output from EXCLUSIVE-NOR 1002. The Q-bar output of D FLIP-FLOP 1004 also couples to an input of EXCLUSIVE-NOR 1008. The second input to EXCLUSIVE-NOR 1008 is coupled to the UP-bar/DN input which is presently a logic 0 level, resulting in a logic 1 output from EXCLUSIVE-NOR 1008 which couples to one input of NOR 1010. The second input to NOR 1010 couples to INVERTER 1006 which is presently a logic 0 level, resulting in a logic 0 level output from NOR 1010, which couples to the input of INVERTER 1012, resulting in a logic 1 level output from INVERTER 1012.

At the same time Q1 is being clocked, the Q2 output of D FLIP-FLOP 1016 remains a logic 0 level because of the logic 0 level at the input of D FLIP-FLOP 1016. The Q1-bar output of D FLIP-FLOP 1016 remains a logic 1 level which couples to the input of EXCLUSIVE-NOR 1014, which together with the logic 1 level present at the second input from INVERTER 1012, results in a logic 1 level output from EXCLUSIVE-NOR 1014 which couples to the data (D2) input of D FLIP-FLOP 1016. The Q-bar output of D FLIP-FLOP 1016 also couples to an input of EXCLUSIVE-NOR 1018. The second input to EXCLUSIVE-NOR 1018 is coupled to the UP-bar/DN input which is presently a logic 0 level, resulting in a logic 1 output from EXCLUSIVE-NOR 1018 which couples to one input of NAND 1020. Since the first input to NAND 1020 is presently a logic 0 level, a logic 1 level remains at the output of NAND 1020. It will be appreciated that the next state of condition 1 becomes the present state of condition 2 of Table 4, wherein the special counter now retains the value of two, indicating special counter 1000 counted up in the desired increment of one.

When special counter 1000 is operating as shown in condition 16, the ½-bar input is a logic 0 level, and the UP-bar/DN input is a logic 1 level, indicating the counter will count down by two. As shown in Table 4 for condition 16, both D FLIP-FLOP 1004 and D FLIP-FLOP 1016 have been set, indicating a value of three. A logic 0 level is coupled from the ½-bar input to one input of EXCLUSIVE-NOR 1002; and also to the input of INVERTER 1006 resulting in a logic 1 level output from INVERTER 1006. The second input of EXCLUSIVE-NOR 1002, which couples to the Q1-bar output of D FLIP-FLOP 1004 which is a logic 0 level, since D FLIP-FLOP 1004 was set, resulting in a logic 1 level at the output of EXCLUSIVE-NOR 1002 which couples to the data (D1) input of D FLIP-FLOP 1004. The Q-bar output of D FLIP-FLOP 1004 also couples to an input of EXCLUSIVE-NOR 1008. The second input to EXCLUSIVE-NOR 1008 is coupled to the UP-bar/DN input which is presently a logic 1 level, resulting in a logic 0 output from EXCLUSIVE-NOR 1008 which couples to one input of NOR 1010. The second input to NOR 1010 couples to INVERTER 1006 which is presently a logic 1 level resulting in a logic 0 level output from NOR 1010, which couples to the input of INVERTER 1012, resulting in a logic 1 level output from INVERTER 1012.

The logic 1 level from INVERTER 1012 couples to one input of EXCLUSIVE-NOR 1014 and to the first input of NAND 1020. The second input of EXCLUSIVE-NOR 1014, which couples to the Q1-bar output of D FLIP-FLOP 1016 which is a logic 0 level, since D FLIP-FLOP 1016 was set, resulting in a logic 0 level at the output of EXCLUSIVE-NOR 1014 which couples to the data (D2) input of D FLIP-FLOP 1016. The Q-bar output of D FLIP-FLOP 1016 also couples to an input of EXCLUSIVE-NOR 1018. The second input to EXCLUSIVE-NOR 1018 is coupled to the UP-bar/DN input which is presently a logic 1 level, resulting in a logic 0 output from EXCLUSIVE-NOR 1018 which couples to the second input of NAND 1020. Since the first input to NAND 1020 is presently a logic 1 level, a logic 1 level output is obtained from NAND 1020.

Upon the next sample clock CLK1, the Q1 output of D FLIP-FLOP 1004 remains a logic 1 level because of the logic 1 level at the input of D FLIP-FLOP 1004. The Q1-bar output of D FLIP-FLOP 1004 remains a logic 0 level which couples to the input of EXCLUSIVE-NOR 1002, which together with the logic 0 level present at the second input, results in a logic 1 level output remaining from EXCLUSIVE-NOR 1002. The Q-bar output of D FLIP-FLOP 1004 also couples to an input of EXCLUSIVE-NOR 1008. The second input to EXCLUSIVE-NOR 1008 is coupled to the UP-bar/DN input which is presently a logic 1 level, resulting in a logic 0 output remaining from EXCLUSIVE-NOR 1008 which couples to one input of NOR 1010. The second input to NOR 1010 couples to INVERTER 1006 which is presently a logic 1 level, resulting in a logic 0 level output remaining from NOR 1010, which couples to the input of INVERTER 1012, resulting in a logic 1 level output from INVERTER 1012.

While the clock has caused no change in the state of D FLIP-FLOP 1104, it has at this time caused the Q2 output of D FLIP-FLOP 1016 to become a logic 0 level because of the logic 0 level at the input of D FLIP-FLOP 1016. The Q1-bar output of D FLIP-FLOP 1016 becomes a logic 1 level which couples to the input of EXCLUSIVE-NOR 1014, which together with the logic 1 level present at the second input from INVERTER 1012, results in a logic 1 level output from EXCLUSIVE-NOR 1014 which couples to the data (D2) input of D FLIP-FLOP 1016. The Q-bar output of D FLIP-FLOP 1016 also couples to an input of EXCLUSIVE-NOR 1018. The second input to EXCLUSIVE-NOR 1018 is coupled to the UP-bar/DN input which is presently a logic 1 level, resulting in a logic 1 output from EXCLUSIVE-NOR 1018 which couples to one input of NAND 1020. Since the first input to NAND 1020 is presently a logic 1 level, the output of NAND 1020 becomes a logic 0 level. It will be appreciated that the next state of condition 16 becomes the present state of condition 14 of Table 4, wherein the special counter now retains a value of one, indicating special counter 1000 counted down in the desired increment of two.

Figure 10B:
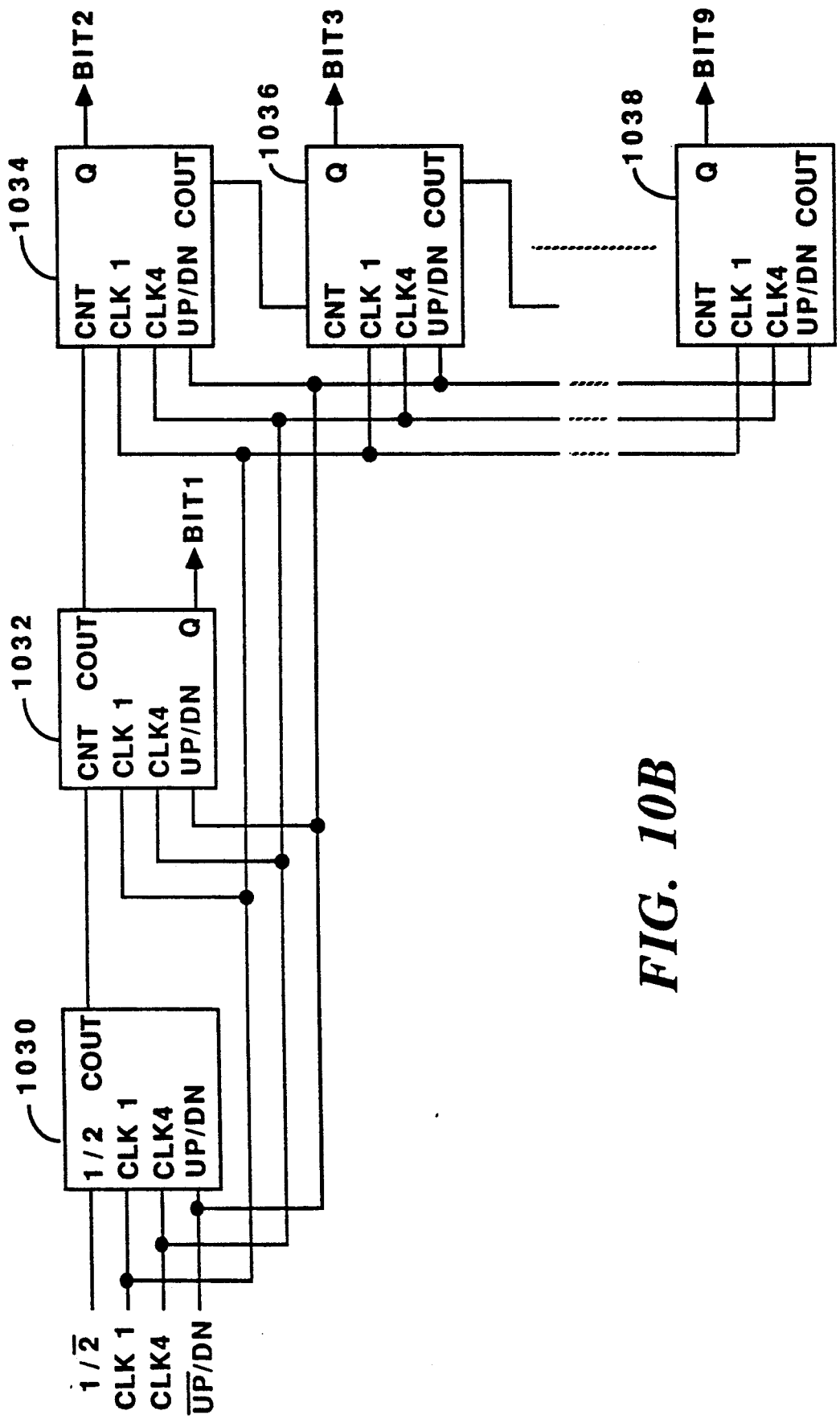
FIG. 10B is an electrical block diagram of the 10 bit subwindow accumulation counter for the digital tone detector of the present invention.

FIG. 10B shows the electrical block diagram of the ten stage subwindow accumulator for the preferred embodiment of the present invention. Counter stage 1030 corresponds to the special up/down counter having provision to count by one or two, as described above in FIG. 10A. Returning to FIG. 10B, counter stages 1034-1038 are conventional up/down counters identical to counter stage 1032 which was described above in FIG. 10A. While only three of the remaining eight counter stages are shown in FIG. 10B, it will be appreciated that a total of nine up/down counter stages identical to 1032 are actually used in the preferred embodiment of the present invention.

Counter stages 1030-1038 each have the CLK1 inputs coupled together, thereby allowing synchronous clocking of the counter stages. Counter stages 1030–1038 each also have the CLK4 inputs coupled together, thereby allowing simultaneous resetting of the entire counter, and counter stages 1030–1038 each have the UP-bar/DN inputs coupled together, thereby allowing simultaneous control of the counter stages for counting up and counting down. As previously described, counter stage 1030 each has a count 1/count 2 (½-bar) input. The CNT input of the second counter stage 1032 couples to the carry output (COUT) of the first counter stage 1030, as described above. The COUT output from the second counter stage 1032 couples to the count (CNT) input of the third counter stage 1034. The COUT output from the third counter stage 1034 couples to the count (CNT) input of the fourth counter stage 1036. COUT output from the fourth counter stage 1036 couples to the count (CNT) input of the fifth counter stage (not shown). COUT output from the ninth counter stage (not shown) couples to the count (CNT) input of the tenth counter stage 1038. The operation of synchronous counter stages 1034–1038 for counting up and down are well known in the art and identical in operation to counter stage 1032 previously described.

The pseudo sinusoidal tone detector of the present invention is suitable for use with any of a number of well known tone signalling protocols. One such tone signaling protocol is the Motorola Quik-Call II, or EIA, two tone signaling protocol. A table of tone decoder constants for use with the EIA two tone paging frequencies is tabulated below in Table 5. For two tone paging, the individual tones are spaced approximately 2.7% apart and range from 288.5 Hz to 2468.2 Hz. In addition, other tone frequencies are frequently used in some paging systems to extend the range of tones to over 3000 Hz. To accommodate the loose frequency tolerances of most early encoders and tone decoding filters, the tone frequency spacing of the EIA tone frequencies was selected for use with constant-Q filters. The pseudo sinusoidal tone detector of the present invention can be used to provide both constant bandwidth and constant-Q operation. The description provided below indicates the operation of the pseudo sinusoidal tone detector operated as a constant-Q type tone detector.

In order to accommodate the loose frequency tolerances of the early, and even some present encoders, which may be accurate to only within 0.5%, the digital correlator utilizes four fixed bandwidth ranges providing increasing bandwidth as the frequencies increase to cover the total range of potential operating frequencies, thereby providing a pseudo constant-Q mode of operation. The bandwidth of the digital tone detector is controlled by the integration time which is equivalent to the total number of samples which are correlated with the reference tone times the sample period. The more samples utilized, the narrower the resultant filter bandwidth. As a result, to change the filter bandwidth, the total numbers of samples can be increased by increasing the number of subwindows, or by increasing the number of samples taken per subwindow. Table 5 lists the frequency dependent constants for use with the tone detector assuming a fixed sampling rate of 19,200 samples per second.

TABLE 5

| Frequency Dependent Tone Decoder Constants | | | | |
|---|---|---|---|---|
| Frequency Range-Hz | Number of Sub-windows | Samples/sub-window | Window Step Width | Maximum Corsum | Threshold −11.0 dB |
| 280–320 | 20 | 192 | 4 | 2304 | 650 |
| 321–460 | 15 | 192 | 3 | 1728 | 487 |
| 461–950 | 10 | 192 | 2 | 1152 | 325 |
| 951–3100 | 5 | 192 | 1 | 576 | 162 |

In addition to the frequency dependent tone decoder constants listed in Table 5 which compensate for the encoded tone accuracies as the tone frequencies are increased, the tone detector needs to generate the pseudo sinusoidal reference tone against which the received tone is correlated. This is accomplished by adding the phase increment (PHINC) to the phase accumulator at each sampling instant to create the phase reference corresponding to the desired tone, as described above. The phase increment is calculated as described above, and although the round off of the phase increment results in a slight frequency error, the magnitude of the error is of no consequence in most tone detection applications. The maximum frequency error due to the round off error can be calculated for the reference tone as follows:

$$F_{error} = (+/-.5) * 19200 \text{ Hz}/65536$$
$$= +/-.146 \text{ Hz}$$

where $+/-0.5$ is the maximum round off error, 19200 is the sampling rate and 65536 is the maximum register length. It will be appreciated that the frequency error can be reduced by using a larger phase accumulator (>than 16 bits), however in most instances the frequency tolerance of the sampling clock, which may be on the order of 100 ppm, will cause a greater frequency error than the error created by rounding off the calculated phase increment.

Figure 11:
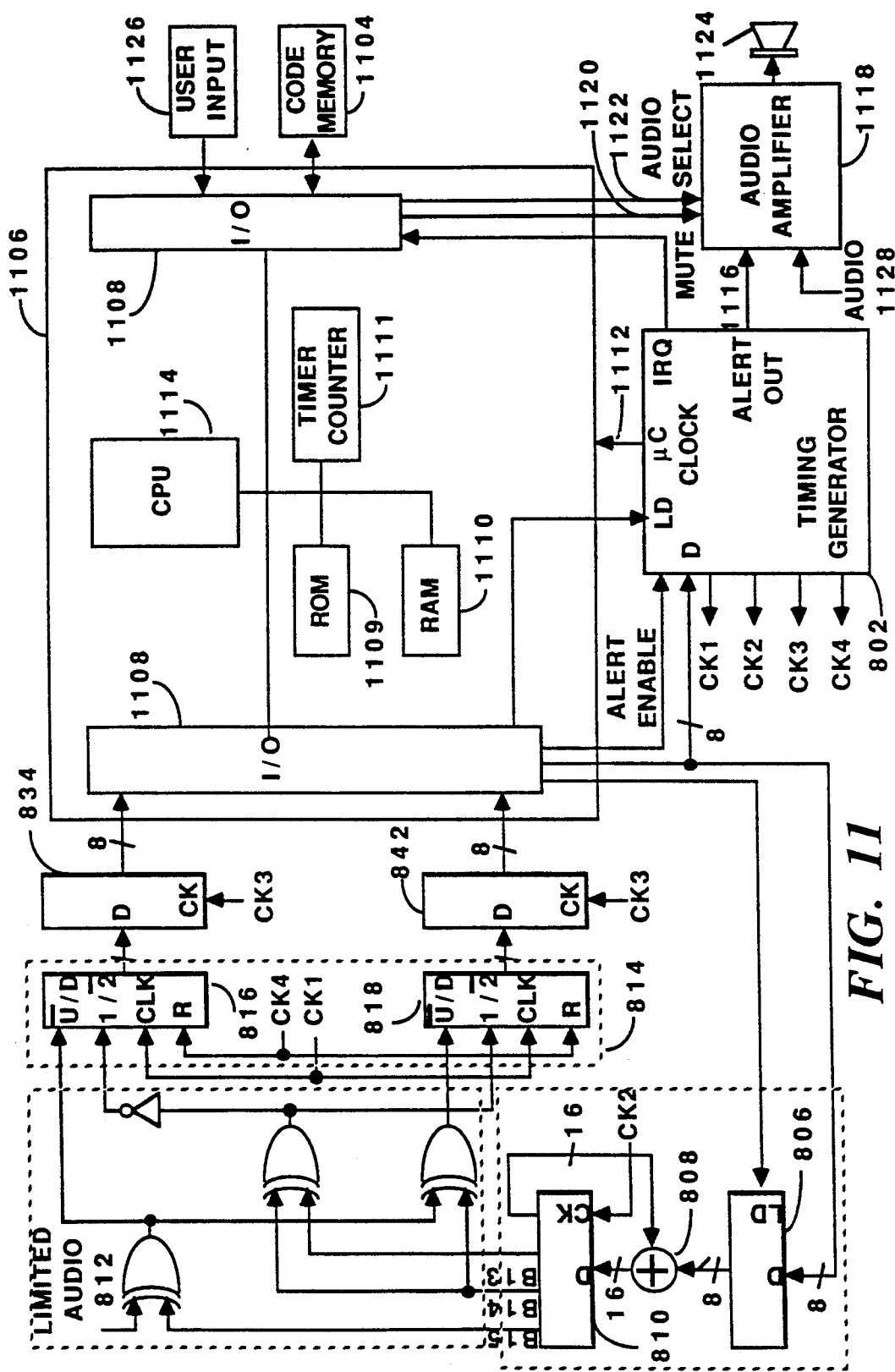
FIG. 11 is an electrical block diagram showing a combination hardware and microcomputer implementation of the digital tone detector of the present invention.

FIG. 11 is an electrical block diagram of a combination hardware/software pseudo sinusoidal tone detector of the present invention which is suitable for use in a selective call communication receiver which is capable of receiving tone signaling and voice messages. As is well known in the art, the two-tone signaling format when used for tone and voice signaling to a selective call communication receiver, such as a tone and voice pager, comprises the transmission of a one second A tone, followed by a three second B tone, followed by the voice message. The A and B tones uniquely identify the particular selective call receiver to which the voice message is directed. The A and B tones that may e present at the output of the receiver are limited, generating a string of one/zero data at the frequency of each received tone. The string of one/zero data is applied to the input 812 of the tone detector 1100 shown in FIG. 11. Code memory 1104 stores information required for the decoding of the tones assigned to the selective call communication receiver. The code memory stores such information as the phase increment for each of the tones, the number of subwindows, the window step width, the number of samples per subwindow, and the correlation threshold value.

When power is initially applied to the selective call receiver, the microcomputer decoder 1106 is initialized. Initialization includes recalling the frequency dependent decoder constants for tone A which are stored in code memory 1104. The phase increment information is recalled from code memory 1104 through I/O 1108, and is loaded into the 16 bit phase increment register 806 through I/O 1108. The number of subwindows and the window step widths are recalled from the code memory 1104 also through I/O 1108 and stored in the microcomputer's random access memory 1110. Unlike the hardware implementation of FIG. 8A which provided a fixed number of subwindow accumulation registers 834-840 and 842-848 corresponding to the number of subwindows and subwindows per step utilized, the subwindow accumulations are stored within a predetermined number of memory areas in RAM 1110 also corresponding to the number of subwindows and subwindows per step utilized. It will be appreciated that the microcomputer decoder approach provides tremendous versatility by not being constrained to a fixed number of subwindow accumulation registers, and a fixed number of subwindows per step as in the hardware approach, and significantly reduces the complexity of the hardware required to provide the decoding process, as shown in FIG. 11. The correlation threshold value is also recalled from code memory 1104 through I/O 1108 and is also stored in RAM 1110 to be utilized by the microcomputer in the determination of the detection of a tone assigned to the selective call receiver. The number of samples per subwindow is further recalled from code memory 1104 through I/O 1108 and loaded into timing generator 802. It will be appreciated in those instances where the number of samples per subwindow are fixed, as shown in Table 5, the number of samples per subwindow may be permanently stored in timing generator 802, otherwise the number of samples per subwindow are stored in code memory 1104.

In the preferred embodiment of the present invention, the microcomputer clock frequency is 8 times the sample clock frequency, or 614.4 KHz which is generated by timing generator 802, as shown in FIG. 11 and which is coupled to the microcomputer clock input 1112. The operation of the hardware portions of the pseudo sinusoidal tone detector of FIG. 11 are the same as that described in FIG. 8A, and will not be repeated herein. Data present at the input of the decoder 812 is processed as described above, and an appropriate value is loaded into the subwindow accumulation counters 814 during each sampling instant corresponding to clock reference signal CK1. The phase accumulator 810 contents is next updated during clock reference signal CK2 by adding the current contents of the phase accumulator 810 with the contents of the phase increment register 806 with adder 808. The current subwindow accumulations derived and stored in the special counters 816 and 818 are transferred into the first stages of the accumulation registers 834 and 842 during clock reference signal CK3. Unlike the hardware pseudo sinusoidal tone detector of FIG. 8A, an interrupt request signal (IRQ) is also generated by the timing generator 802 and is coupled to the microcomputer interrupt request input through I/O 1108. The IRQ signal corresponds in time to clock signal CK4, enabling the most recent accumulation value stored in subwindow accumulation registers 834 and 842 to be transferred into the appropriate storage location in RAM 1110 through I/O 1108. The subwindow accumulations transferred into RAM 1110 are processed by the central processing unit (CPU) 1114, which performs the appropriate calculations to the subwindow accumulation data, as performed in the hardware subwindow accumulator registers 830 and 832. Correlation of the received signal continues until tone detection of tone A is determined, as described above. A flowchart of the microcomputer 1106 operation will be described in FIG. 12.

Returning to FIG. 11, once tone A has been detected, the microcomputer recalls the frequency dependent decoder constants for tone B which are stored in code memory 1204. The correlation procedure for the detection of tone B is the same as described for tone A above. Upon detection of tone B, the microcomputer instructs the timing generator 802 to generate an alert signal which couples to the alert input of the audio amplifier 1118. Microcomputer 1106 which has previously been generating an audio mute signal 1120, which has muted the audio amplifier during the standby mode, unmutes the audio amplifier. Microcomputer 1106 also generates an audio select signal 1122 which is coupled to the audio amplifier 1118 through I/O 1108. The audio select signal 1122 enables the amplification of the alert signal 1116 which is then coupled to speaker 1124 to audible announce the present reception of a voice message. The microcomputer decoder continues to maintain the generation of the alert tone for the duration of the time tone B continues to be detected. Upon failure to continue to detect tone B, the microcomputer 1106 generates an audio select signal 1122 which enables the selection of the audio message 1128 following tone B to be amplified in audio amplifier 1118, for presentation through speaker 1124 to the user. The audio amplifier remains unmuted for the presentation of the voice message being transmitted, until either a predetermined time interval has elapsed, such as ten seconds, or until an audio reset signal is generated by the user through user input 1126 which couples into microcomputer 1106 through I/O 1108. When either the timeout occurs, or a user generated reset signal occurs, microcomputer 1106 again generates a mute signal 1120 muting the audio amplifier 1118. The microcomputer then recalls the frequency dependent decoder constants for tone A which are stored in code memory 1104, returning to correlate for the next occurrence of tone A, as described above.

Figure 12A:
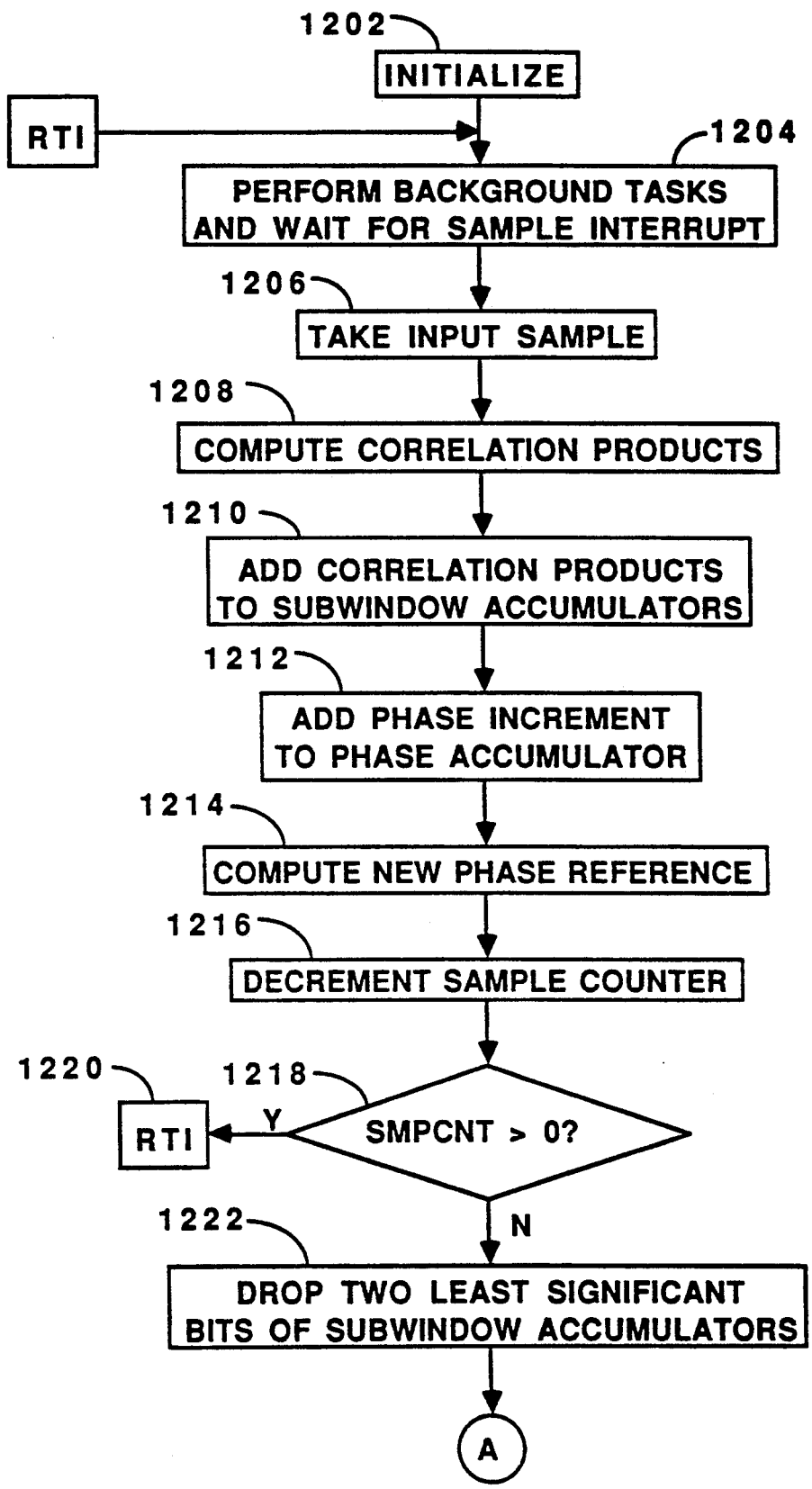
FIG. 12 is a flow chart depicting the microcomputer implemented digital tone detector of the present invention.
Figure 12B:
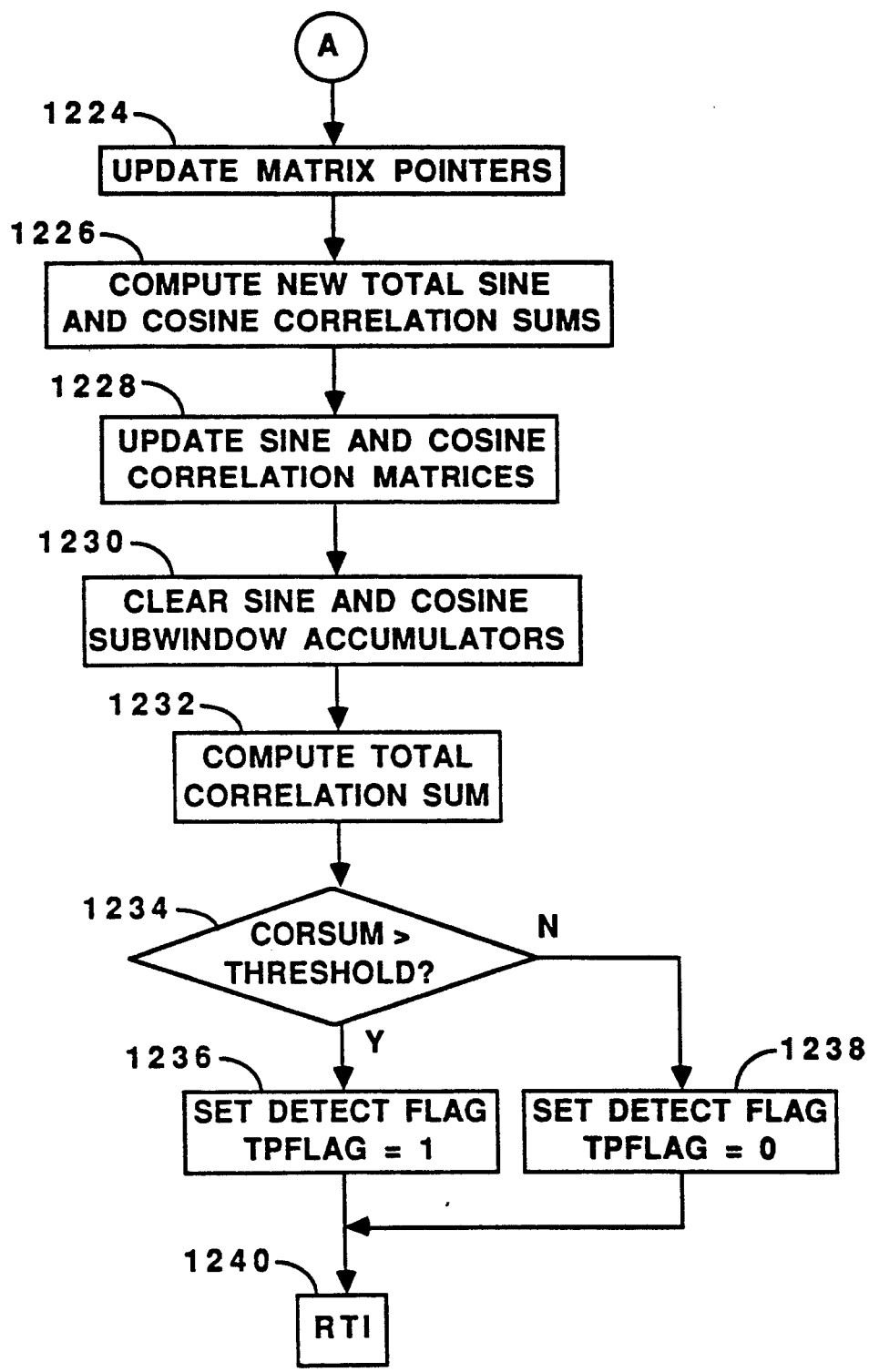

It will be appreciated from the descriptions of the operation of the pseudo sinusoidal tone detectors shown in FIGS. 8A and 11, such tone detection may also be performed completely under microcomputer control, without the necessity of any additional external hardware. A flow chart describing the operation of such a microcomputer controlled pseudo sinusoidal tone detector is shown in FIG. 12. As shown in FIG. 12, when power is initially applied to the decoder, the microcomputer is initialized, as shown at step 1202. As part of the initialization step, a number of arrays and variables used by the decoder in the correlation process which are located in memory are initialized. The arrays and variables initialized include, but not limited to the following:

| | |
|---|---|
| $SINMAT = 0$ | $COSMAT = 0$ |
| $SINACC = 0$ | $COSACC = 0$ |
| $PHASACC = 0$ | $PHASREF = 0$ |
| $MXPTR = 0$ | $TPFLAG = 0$ | where SINMAT and COSMAT are memory arrays, each having a maximum size corresponding to the total number of subwindows times the number of subwindows per step, i.e. if there are five subwindows and two subwindows per step, the maximum array size required is ten. The SINACC and COSACC are memory locations storing the sine and cosine quadrature accumulations previously stored in registers 834 and 842 respectively of the hardware implementations of FIGS. 8A and 12. PHASACC is a memory location corresponding to the current phase accumulator value stored in phase accumulator 810, and PHASREF is the phase increment value stored in the phase increment register 806 in the hardware implementation. MXPTR is a memory location holding the current value of the matrix pointer which corresponds to the location in a matrix memory array where the most recent subwindow accumulation is or is to be stored, and TPFLAG is a bit in memory that indicates whether or not a tone is present (tone present flag).

The microcomputer next recalls the frequency dependent decoder constants from the code memory as part of the initialization step 1202. The frequency dependent decoder constants recalled from memory include:

$$PHINC = PHASE\ INCREMENT = (Fo/Fs)*65536$$

$$NUMSUB = NUMBER\ OF\ SUBWINDOWS$$

NUMSAMS = NUMBER OF SAMPLES TAKEN PER SUBWINDOW

SW = STEP WIDTH OF WINDOW WEIGHTING FUNCTION

THRESH = TONE DETECTION CORRELATION THRESHOLD

Initialization step 1202 continues with the sample counter next being loaded with the number of samples, NUMSAMS, to be taken per subwindow, $$SMPCNT = NUMSAMS$$

Finally, the sample interrupt counter is initialized at step 1202, and started to provide the periodic interrupts at the desired sampling rate.

Once the microcomputer has been initialized at step 1202, the microcomputer begins performing the various background tasks which are not part of the decoding function, while waiting for the next sample interrupt, as step 1204. Typical background tasks include such functions as operating on user inputs, monitoring the battery condition and alerting the user to a bad battery condition. When an interrupt is generated, the microcomputer samples the receiver limiter output, at step 1306, which is either a 1 or a 0 value, and stores the result, INSAMPL, in an input sample register. INSAMPL has a value of +1 or −1, depending upon whether the input signal is a logic 1 or a logic 0, respectively.

$$INSAMPL = INPUT\ SAMPLE\ VALUE$$

The sine and cosine correlation products, SINCOR and COSCOR respectively, are next computed at step 1208. The sine and cosine correlation products are computed as follows:

IF INSAMPL = 1 THEN
 SINCOR = SINTAB(PHASREF)

AND COSCOR = SINTAB((PHASREF+2) MOD 8)

ELSE SINCOR = −SINTAB(PHASREF)

AND COSCOR = −SINTAB((PHASREF+2) MOD 8)

Figure 6:
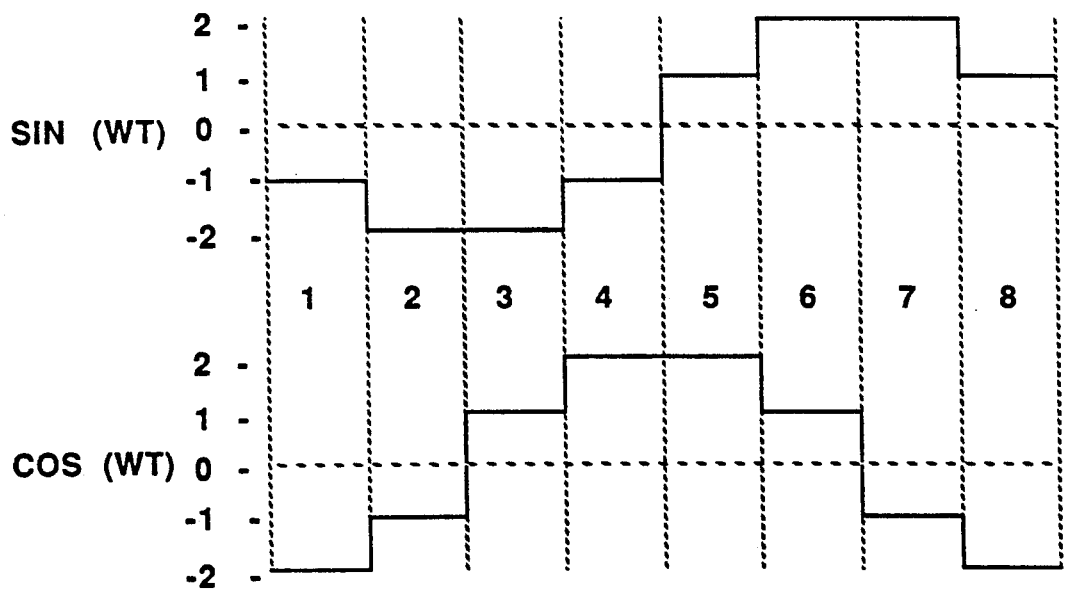
FIG. 6 is a pictorial representation of the pseudo sinusoidal quadrature reference signals utilized in the digital tone detector of the present invention.

The SINTAB function takes on the values 1, 2, −1, and −2 and correspond to the values for each of the octants of the phase reference signal, as shown in FIG. 6, corresponding to the most significant bits of the phase accumulator 810, as follows shown in Table 6 below

TABLE 6

| PHASACC 15 | 14 | 13 | PHASREF | SINTAB | COSTAB |
|---|---|---|---|---|---|
| 0 | 0 | 0 | 0 | −1 | −2 |
| 0 | 0 | 1 | 1 | −2 | −1 |
| 0 | 1 | 0 | 2 | −2 | 1 |
| 0 | 1 | 1 | 3 | −1 | 2 |
| 1 | 0 | 0 | 4 | 1 | 2 |
| 1 | 0 | 1 | 5 | 2 | 1 |
| 1 | 1 | 0 | 6 | 2 | −1 |
| 1 | 1 | 1 | 7 | 1 | −2 |

Assuming this was the first sample taken, the value of PHASREF would have been as initialized, equal to 0. The computed correlation products are next added to the sin and cosine subwindow accumulator registers, SINACC and COSACC respectively, in step 1210, as follows:

$$SINACC = SINACC + SINCOR$$

$$COSACC = COSACC + COSCOR$$

Again, should this have been the first sample taken, the SINACC and COSACC values would have been as initialized, equal to 0. The value of the phase increment is next added to the phase accumulator register, PHASACC, at step 1212 as follows:

$$PHASACC = (PHASACC + PHINC)\ MOD\ 65536$$

where MOD 6556 denotes the integer value that is the remainder of an integer division by 65536. In actual operation, the PHASACC simply "rolls" over after reaching its maximum value of 65535.

A new value for the phase reference is then computed at step 1214, as follows:

$$PHASREF = INT(8*PHASACC/65536)$$

The sample counter is next decremented, at step 1216 such that $$SMPCNT = SMPCNT - 1$$

The sample count is tested to determined if the subwindow accumulation is completed, at step 1318, as follows:

IF SMPCNT > 0 THEN GOTO 1320

ELSE SMPCNT = NUMSAMS

If the subwindow accumulation is not completed, i. e. the sample count is greater than 0, the microcomputer returns from the interrupt and goes to step 1220 which returns the program to step 1204 to await for the next interrupt at which time another sample is taken. If the sample count is equal to 0, indicating the total number of samples have been taken for the current subwindow, at step 1218, the SINACC and COSACC registers are read and the two least significant digits of the registers are dropped, at step 1222, thereby maintaining the storage register size as eight bits, as follows:

$$SINACC = INT(0.25 * SINACC)$$

$$COSACC = INT(0.25 * COSACC)$$

The matrix pointer is tested, at step 1224, as shown below to determine whether the matrix pointer is at the bottom of the matrix, after which the matrix pointers are updated to point at the oldest subwindow accumulation in the matrix as follows:

$$IF\ MXPTR = 0\ THEN\ MXPTR = NUMSUB - 1$$

$$ELSE\ MXPTR = MXPTR - 1$$

$$MXPTR1 = (MXPTR + NUMSUB - SW)\ MOD\ NUMSUB$$

$$MXPTR2 = (MXPTR + SW)\ MOD\ NUMSUB$$

where MXPTR1 points at the subwindow accumulation falling immediately after the trailing step edge, and MXPTR2 points at the subwindow accumulation immediately after the leading step edge. The new sine and cosine correlation sums are next computed at step 1226. In the hardware/software implementation of FIG. 11, the microcomputer would perform the functions indicated in steps 1224-1240, as steps 1202-1222 are performed by the hardware portion of the pseudo sinusoidal tone detector.

$$OLDSC = SINMAT(MXPTR) + SINMAT(MXPTR1)$$

$$OLDCC = COSMAT(MXPTR) + COSMAT(MXPTR1)$$

$$NEWSC = SINACC + SINMAT(MXPTR2)$$

$$NEWCC = COSACC + COSMAT(MXPTR2)$$

$$TOTSIN = TOTSIN + NEWSC - OLDSC$$

$$TOTCOS = TOTCOS + NEWCC - OLDCC$$

where OLDSC and OLDCC are respectively the subwindow accumulation that need to be subtracted off the total sine and cosine correlation sums, while the NEWSC and NEWCC are respectively the subwindow accumulations that need to be added to the total sine and cosine correlation sums. The sine and cosine correlation matrices are nex updated by replacing the oldest subwindow accumulation with the newest, or current accumulation, at step 1228, as follows:

$$SINMAT(MXPTR) = SINACC$$

$$COSMAT(MXPTR) = COSACC$$

The sine and cosine subwindow accumulators are then cleared, at step 1230, to begin the next subwindow sampling cycle.

$$SINACC = 0$$

$$COSACC = 0$$

The total correlation sum is then computed, at step 1232, as follows:

$$IF\ ABS(TOTSIN) > OR = ABS(TOTCOS)$$

$$THEN$$
$$\quad CORSUM = ABS(TOTSIN) + 0.5 * ABS(TOTCOS)$$

$$ELSE$$
$$\quad CORSUM = 0.5 * ABS(TOTSIN) + ABS(TOTCOS)$$

The correlation sum is compared to the detection threshold, at step 1234. If the correlation sum is greater than or equal to the detection threshold, at step 1236, the detect flag is set indicating a tone detection has occurred. If the correlation sum is less than the detection threshold, at step 1234, the detect flag, when set, is cleared, indicating the absence of the desired tone. The program returns to step 1204 at step 1240 to again wait for the next interrupt to begin sampling for the presence of a tone.

The operation of the pseudo sinusoidal tone detector implemented using a microcomputer as described by the flowchart of FIG. 12, is best illustrated by the example to follow. Suppose it is desired to detect the presence of a 1000 Hz tone. Assume the sampling rate to be 19.2 KHz, the phase increment to be 3413, as previously described, and the following detector constants selected from Table 5: number of subwindows (5), number of samples per subwindow (192), step width (1), and correlation threshold (162).

Table 7 illustrates the typical operation of accumulating and processing a samples during a complete subwindow interval. It is assumed the tone detector has been operating for some time, as as a result the phase accumulator has an arbitrary initial value other than 0 stored. In addition, the following example assumes a number of subwindows have been processed during which the desired tone was not present, however, just prior to the new subwindow accumulation, the desired tone has appeared at the input to the tone detector. It will be appreciated that in any actual situation, the desired tone will be most likely not aligned with the phase detector reference, i.e. not in synchronization with the sine and cosine reference signals, and for purpose of the following example, it is assumed the desired tone to be leading the phase reference signals by approximately 119.45 degrees.

In the example shown in Table 7 above, the subwindow accumulation starts with the sample counter (SMPCNT) loaded with 192, corresponding to step 1202 of FIG. 12. The first sample taken (INSAMPL), corresponding to step 1206 of FIG. 12, is a 0, and the phase accumulator (PHASACC) is at 64,768 indicating a phase reference value of 7 derived from the three most significant bits of the phase accumulator.

TABLE 7

| | | | Sample Subwindow Accumulation | | | | | | |
|---|---|---|---|---|---|---|---|---|---|
| SMPCNT | INSAMPL | PHASACC | PHASREF | SINTAB | COSTAB | SINCOR | COSCOR | SINACC | COSACC |
| 192 | 0 | 64,768 | 7 | 1 | −2 | −1 | 2 | −1 | 2 |
| 191 | 0 | 2,645 | 0 | −1 | −2 | 1 | 2 | 0 | 4 |
| 190 | 0 | 6,058 | 0 | −1 | −2 | 1 | 2 | 1 | 6 |

TABLE 7-continued

| | | | | Sample Subwindow Accumulation | | | | | |
|---|---|---|---|---|---|---|---|---|---|
| SMPCNT | INSAMPL | PHASACC | PHASREF | SINTAB | COSTAB | SINCOR | COSCOR | SINACC | COSACC |
| 189 | 0 | 9,471 | 1 | −2 | −1 | 2 | 1 | 3 | 7 |
| 188 | 1 | 12,884 | 1 | −2 | −1 | −2 | −1 | 1 | 6 |
| 187 | 1 | 16,297 | 1 | −2 | −1 | −2 | −1 | −1 | 5 |
| 186 | 1 | 19,710 | 2 | −2 | 1 | −2 | 1 | −3 | 6 |
| 185 | 1 | 23,123 | 2 | −2 | 1 | −2 | 1 | −5 | 7 |
| 184 | 1 | 26,536 | 3 | −1 | 2 | −1 | 2 | −6 | 9 |
| 183 | 1 | 29,949 | 3 | −1 | 2 | −1 | 2 | −7 | 11 |
| 182 | 1 | 33,362 | 4 | 1 | 2 | 1 | 2 | −6 | 13 |
| 181 | 1 | 36,775 | 4 | 1 | 2 | 1 | 2 | −5 | 15 |
| 180 | 1 | 40,188 | 4 | 1 | 2 | 1 | 2 | −4 | 17 |
| 179 | 1 | 43,601 | 5 | 2 | 1 | 2 | 1 | −2 | 18 |
| 178 | 0 | 47,014 | 5 | 2 | 1 | −2 | −1 | −4 | 17 |
| 177 | 0 | 50,427 | 6 | 2 | −1 | −2 | 1 | −6 | 18 |
| 176 | 0 | 53,840 | 6 | 2 | −1 | −2 | 1 | −8 | 19 |
| 175 | 0 | 57,253 | 6 | 2 | −1 | −2 | 1 | −10 | 20 |
| 174 | 0 | 60,666 | 7 | 1 | −2 | −1 | 2 | −11 | 22 |
| 173 | 0 | 64,079 | 7 | 1 | −2 | −1 | 2 | −12 | 24 |
| 172 | 0 | 1,956 | 0 | −1 | −2 | 1 | 2 | −11 | 26 |
| — | — | — | — | — | — | — | — | — | — |
| — | — | — | — | — | — | — | — | — | — |
| — | — | — | — | — | — | — | — | — | — |
| 0 | 0 | 62,058 | 7 | 1 | −2 | −1 | 2 | −112 | 232 |

A phase reference value of 7 corresponds with a SINTAB value of 1 and COSTAB value of −2 derived from Table 6. The sine (SINCOR) and cosine (COSCOR) correlation products are computed, corresponding to step 1208 of FIG. 12. The SINCOR and COSCOR values are then added to the sine and cosine accumulators which were initialized to zero at step 1202 of FIG. 12, prior to the start of the new subwindow accumulation. The phase increment (3413) is next added to the phase accumulator, corresponding to step 1212 of FIG. 12, and the new phase reference value is calculated, corresponding to step 1214 of FIG. 12. The sample count (SMPCNT) is next decremented, corresponding to step 1216 of FIG. 12, and is tested to determine if the sample count is equal to zero, corresponding to step 1218 of FIG. 12. Since the sample count has not reached 0, but only 191, the program returns to await the next sample. The process continues, as shown in Table 7, until the subwindow accumulation is completed, when SMPCNT equals 0. At the completion of the example accumulation of Table 7, the SINACC contains −112 while the COSACC contains 232.

the example, it is assumed that the correlation process has been active for some time, and that the sine and cosine matrices (SINMAT and COSMAT) are loaded with previous subwindow accumulations processed during a period in which the desired tone was not transmitted. The matrix pointer (MTXPTR) is arbitrarily pointing at 3, which means that when the pointer is updated, corresponding to step 1224 of FIG. 12, the newest subwindow accumulations will be stored at SINMAT(2) and COSMAT(2). The sine matrix registers are shown, for this example in Table 8, and the cosine matrix registers are shown in Table 9 above.

After each new subwindow accumulation has been completed, the processing of the new subwindow accumulation begins by dropping the two least significant bits of the new sine and cosine accumulations, corresponding to step 1222 of FIG. 12. This maintains a maximum register size of eight (1 sign bit and 7 magnitude bits). In the examples shown in Tables 8 and 9, after dropping the two least significant bits, the new SINACC is −28 and the new COSACC is 58. The matrix pointer MXPTR) is next updated, decrementing

TABLE 8

| | | Sine Matrix Calculations | | | | | | |
|---|---|---|---|---|---|---|---|---|
| MXPTR | SINACC | (4) | (3) | (2) | (1) | (0) | TOTSC | CORSUM |
| 3 | 33 | 11 | 33 | −14 | 48 | −47 | 43 | 56 |
| 2 | −28 | 11 | 33 | −28 | 48 | −47 | 14 | 111 |
| 1 | −28 | 11 | 33 | −28 | −28 | −47 | −43 | 196 |
| 0 | −28 | 11 | 33 | −28 | −28 | −28 | −63 | 350 |
| 4 | −28 | −28 | 33 | −28 | −28 | −28 | −163 | 528 |
| 3 | −28 | −28 | −28 | −28 | −28 | −28 | −224 | 576 |

TABLE 9

| | | Cosine Matrix Calculations | | | | | | |
|---|---|---|---|---|---|---|---|---|
| MXPTR | COSACC | (4) | (3) | (2) | (1) | (0) | TOTCC | CORSUM |
| 3 | 41 | −53 | 41 | −52 | 20 | 25 | −27 | 56 |
| 2 | 58 | −53 | 41 | 58 | 20 | 25 | 104 | 111 |
| 1 | 58 | −53 | 41 | 58 | 58 | 25 | 175 | 196 |
| 0 | 58 | −53 | 41 | 58 | 58 | 58 | 319 | 350 |
| 4 | 58 | 58 | 41 | 58 | 58 | 58 | 447 | 528 |
| 3 | 58 | 58 | 58 | 58 | 58 | 58 | 464 | 576 |

Each new subwindow accumulation is next processed in accordance with steps 1222–1240 of FIG. 12, resulting in a new updated correlation sum. Continuing with from 3 to 2, corresponding to step 1224 of FIG. 12, and the new matrix pointers for the leading (MXPTR2) and trailing (MXPTR1) step edges are calculated, corresponding to step 1224 of FIG. 12. The trailing edge pointer is calculated as MXPTR1=(2+5−1) MOD 5=1, where 2 is the current pointer MXPTR value, 5 is the number of subwindows (NUMSUB) and 1 is the step width (SW). The leading edge pointer is calculated as MXPTR2=(2+1) MOD 5=3, where 2 is again the current pointer MXPTR value, and 1 is the step width (SW).

After updating the matrix pointers, the total sine and cosine correlation sums are computed, as shown in Tables 8 and 9, corresponding to step 1226 of FIG. 12. First, the subwindow accumulations that are required to be subtracted out of the previous total correlation sum are calculated. The older accumulations, pointed to by MXPTR and MXPTR1, are added together for both the sine and the cosine resulting in the sums OLDSC=34 and OLDCC=−32, corresponding to step 1226 of FIG. 12. Next, the NEWSC and NEWCC are computed by adding the new sine and cosine accumulations SINACC and COSACC to the subwindow accumulation pointed to by MXPTR2, resulting in the sums NEWSC=5 and NEWCC=99, corresponding to step 1228 of FIG. 12. Finally, the new total sine (TOTSIN) and cosine (TOTCOS) correlation sums are computed by respectively adding the NEWSC and NEWCC values to the previous TOTSIN and TOTCOS sums and respectively subtracting the OLDSC and OLDCC values from the TOTSIN and TOTCOS sums, corresponding to step 1226 of FIG. 12, which results in TOTSIN=14 and TOTCOS=104).

The matrix is updated with the new SINACC and COSACC, corresponding to step 1228 of FIG. 12, by storing the sums at the location pointed to by the matrix pointer. The sine subwindow accumulator SINACC and cosine subwindow accumulator COSACC are next cleared, corresponding to step 1230 of FIG. 12, in preparation for the next subwindow accumulation.

The new correlation sum is then calculated using the formula CORSUM=0.5*ABS(TOTSC)+ABS(-TOTCC)=7+104=111, corresponding to step 1232 of FIG. 12. The formula for the CORSUM was selected as the cosine component was larger than the sine component. The CORSUM is then compared to the detection threshold, corresponding to step 1234 of FIG. 12, and the detect flag is set when the sum exceeds the given threshold, and otherwise cleared. For 5 subwindow accumulations and an −11.0 dB threshold, the detection threshold correlation sum is 162, as shown in Table 5. Thus, the threshold is not exceeded and the flag is cleared, corresponding to step 1238 of FIG. 12. Upon completing step 1238, the program returns to step 1204 and a new subwindow accumulation begins and proceeds in the same fashion as described above. After completing the next subwindow accumulation, the TOTSIN and TOTCOS sums will be updated as before, and a new CORSUM will be computed. The new CORSUM, after this second subwindow accumulation and processing, is found to equal 196 which exceed the threshold value of 162; consequently, the detect flag will be set at step 1236.

Figure 13:
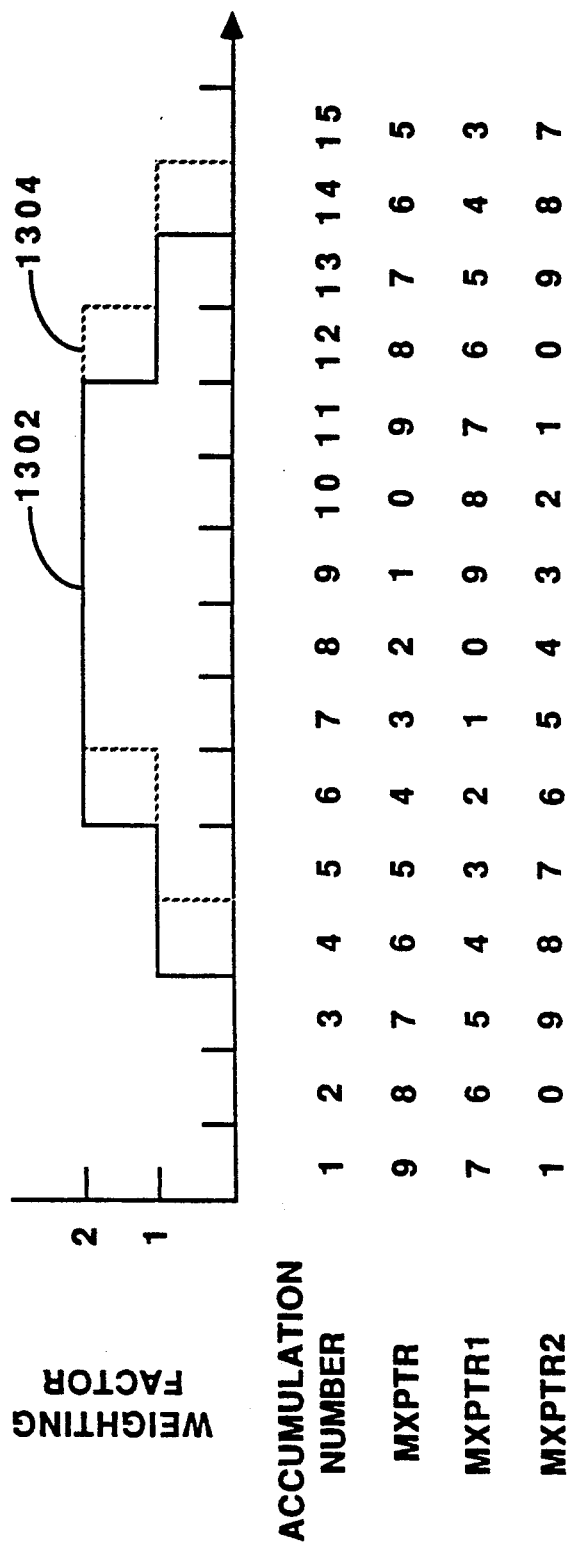
FIG. 13 is a timing diagram showing the effect of the "stepped" observation window in time for the digital tone detector of the present invention.

The operation of updating the matrix pointer MXPTR and calculating the new total sine (TOTSIN) and total cosine (TOTCOS) correlation sums at steps 1224 and 1226 are best understood by referring to FIG. 13 and the following description. For purposes of the following description, ten subwindow accumulations will be described during the period of the "stepped" observation window, as opposed to five subwindow accumulations previously described in the examples provided above. The stepped outline 1302 is the window weighting function previously described applied to the sine and cosine accumulations stored in the sin and cosine matrices. The numbers immediately below FIG. 13 indicate the number of subwindow accumulations that have been processed since the start of the correlation process. The most recent subwindow accumulation is indicated as 13 in FIG. 13. The subwindow accumulations represented as 4 through 13 are used in the total correlation sum at the instant in time represented by the solid black outline 1302. As shown in FIG. 13, the total correlation sum is being computed over the latest ten subwindows. When the next subwindow accumulation is completed, indicated as 14, the subwindow accumulation indicated as 5 through 14, shown under the dotted line 1304 are used to compute the new total correlation sum, and the subwindow accumulation indicated as 4 is discarded.

The ten sine and cosine subwindow accumulations used in the total correlation sums are stored in matrices composed of ten registers, in this example. The next set of numbers below FIG. 13, labeled MXPTR identify the matrix register in which the ten most recent accumulations are stored. The newest subwindow accumulation always replaces the oldest accumulation. As a result, subwindow accumulation indicated as 14, when completed is stored in register 6, as indicated by the value for MXPTR, replacing the previous contents of register 6, and MXPTR is then decremented so that the new oldest register is indicated.

To compute the total correlation sum for the sine or cosine, and to apply the window weighting function, the contents of all ten registers in the matrix are summed, and to this sum, the sum of the contents of the middle six registers, corresponding to the middle portion of the weighting function, is added. This addition would result in the middle six registers being added twice to create the "stepped" window, or weighting function.

An alternative method for processing the secondary addition, or multiplication by two of the subwindow accumulations within the middle portion of the "stepped" weighting function, which requires less computation, is to calculate the difference caused by the new subwindow accumulations and the effectively "sliding" window function, as shown in FIG. 13. In the second method, when subwindow accumulation indicated as 14 is completed, the result is stored in register 6, as indicated by MXPTR, replacing the contents of register 6. The old contents of register 6 is first subtracted out of the total correlation sum, and the new contents of register 6 is then added into the correlation sum. Similarly, the old contents of register 4, indicated by MXPTR1, is subtracted out of the total correlation sum to create the trailing step, and the contents of register 8, indicated by MXPTR2, is added into the total correlation sum to create the leading step. Matrix pointer MXPTR1 identifies the register on the trailing edge of the step that must be subtracted out, and matrix pointer MXPTR2 identifies the register on the leading edge of the step that must be added into the total correlation sum. Mathematically, this alternative method is expressed as follows:

$$OLDSC = SIN(MAT(MXPTR)) + SIN\text{-}MAT(MXPTR1)$$

Figure 14:
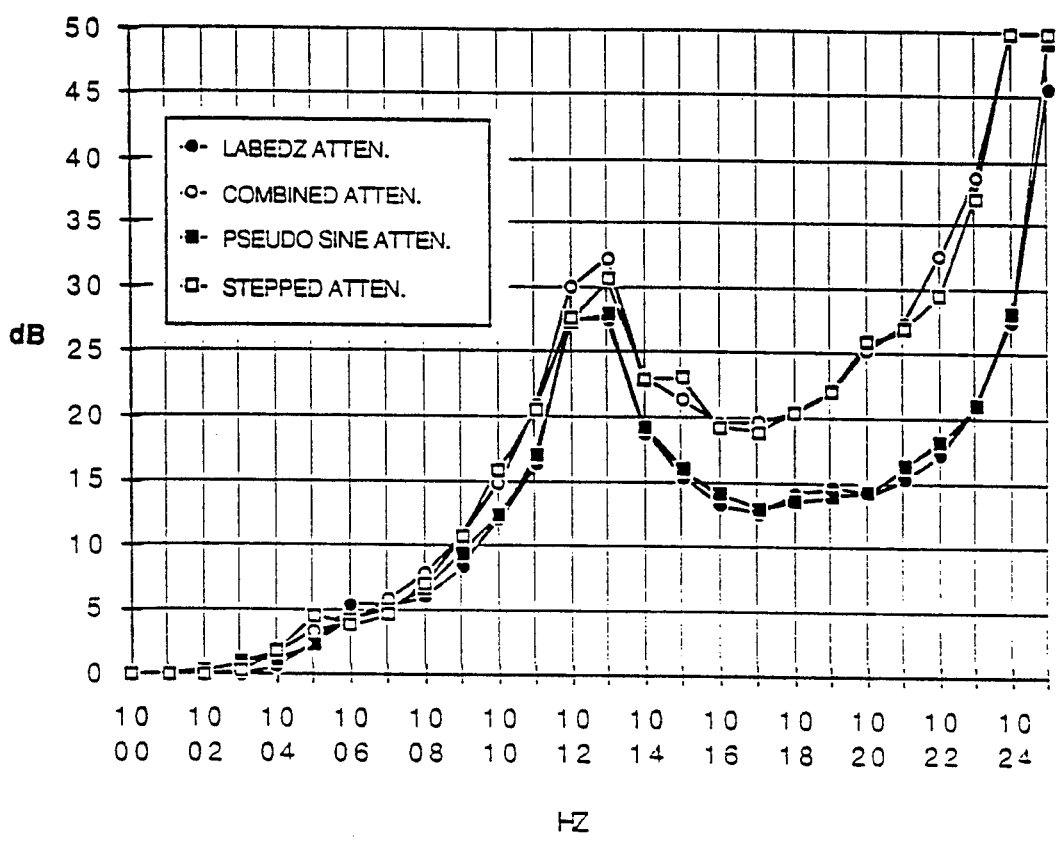
FIG. 14 is a chart showing the center frequency, or mainlobe, frequency response of the digital tone detector of the present invention.

$OLDCC = COSMAT(MXPTR) + COSMAT(MXPTR1)$ $NEWSC = SINACC + SINMAT(MXPTR2)$ $NEWCC = COSACC + COSMAT(MXPTR2)$ and $TOTSIN = TOTSIN + NEWSC - OLDSC$ $TOTCOS = TOTCOS + NEWCC - OLDCC$ Reference is now directed to FIG. 14, which shows a graphic representation of the mainlobe and first sidelobe response of the pseudo sinusoidal tone filter of the present invention as compared to the prior art tone filter response. The frequency response of the prior art Labedz detector is compared to the responses of the tone detector of the present invention in which only the "stepped" window function is utilized, in which only the pseudo sinusoidal reference signals are utilized, and in which both the "stepped" window and the pseudo sinusoidal reference signals are utilized. It will be noted that an improvement of approximately 7 dB is realized in the attenuation of the first sidelobe response of the detector where the first sidelobe peaks at about 16 Hz as shown in FIG. 14. This improvement is due primarily to the "stepped" window function.

Figure 15:
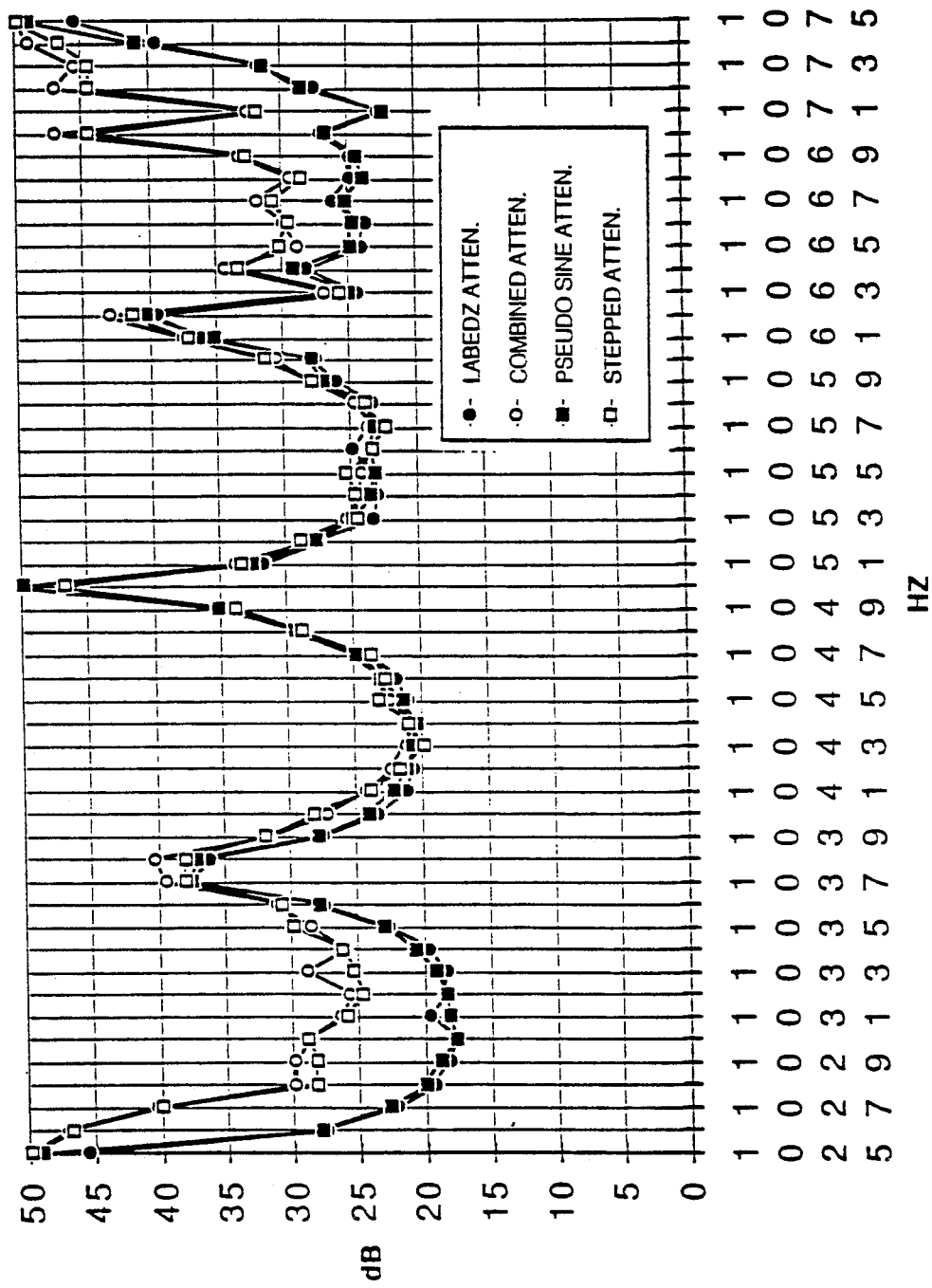
FIG. 15 is a chart showing the upper sidelobe frequency response of the digital tone detector of the present invention.

Reference is now directed to FIG. 15, which shows a graphic representation of the upper sidelobe frequency response of the pseudo sinusoidal tone filter of the present invention as compared to the prior art tone filter response. The response of the prior art Labedz detector is compared to the responses of the tone detector of the present invention in which only the "stepped" window function is utilized, in which only the pseudo sinusoidal reference signals are utilized, and in which both the "stepped" window and the pseudo sinusoidal reference signals are utilized. It will be noted that an improvement in the attenuation of the detector of approximately 7 to 10 dB is obtained at 25 Hz to 35 Hz above the center frequency of 1000 Hz, further showing the improved tone selectivity of the tone detector of the present invention, due primarily to the stepped window function.

Figure 16:
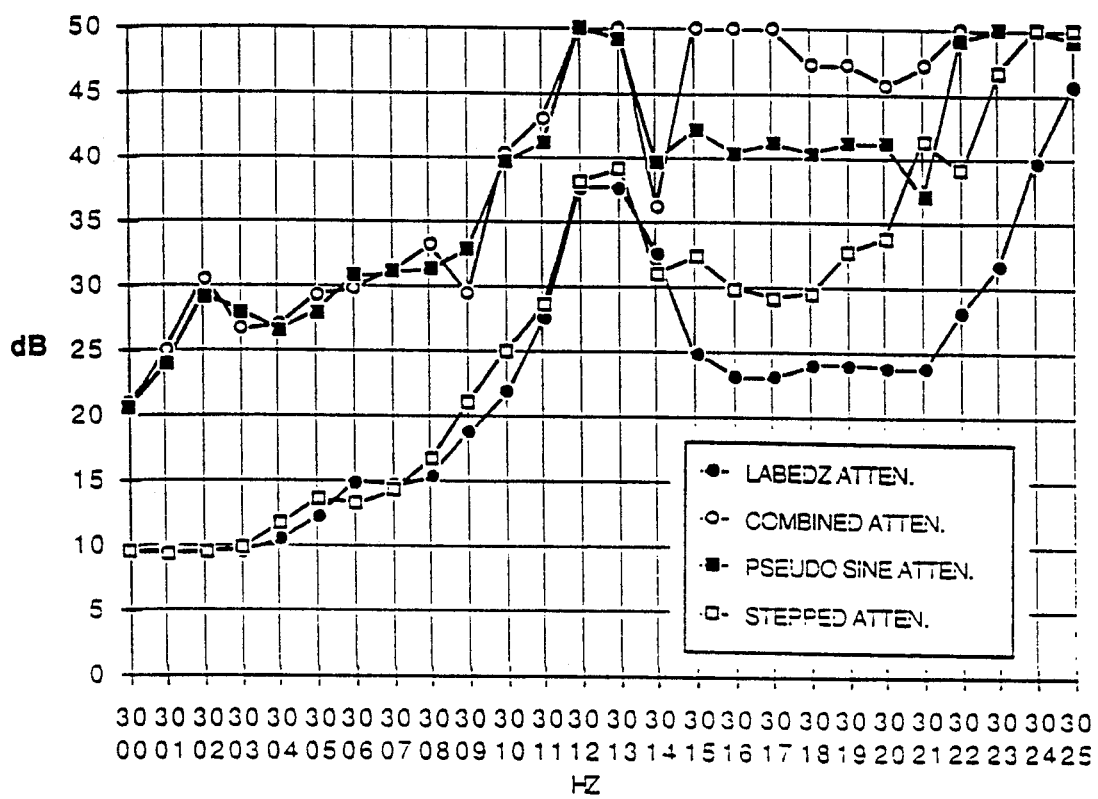
FIG. 16 is a chart showing the 3rd harmonic frequency response of the digital tone detector of the present invention.

Reference is now directed to FIG. 16, which shows a graphic representation of the 3rd harmonic frequency response for of the pseudo sinusoidal tone filter of the present invention as compared to the prior art tone filter response. The frequency response of the prior art Labedz detector is compared to the responses of the tone detector of the present invention in which only the "stepped" window function is utilized, in which only the pseudo sinusoidal reference signals are utilized, and in which both the "stepped" window and the pseudo sinusoidal reference signals are utilized. It will be noted that an improvement in the attenuation of the detector of approximately 10 dB is obtained at the 3rd harmonic of the 1000 Hz center frequency, due mainly to the utilization of the pseudo sinusoidal reference signals. Above 13 Hz of the 3rd harmonic center frequency, it should be noted both the "stepped" window function and the pseudo sinusoidal reference signals contribute to the improvement in filter rejection, as compared to the prior art Labedz filter.

Figure 17:
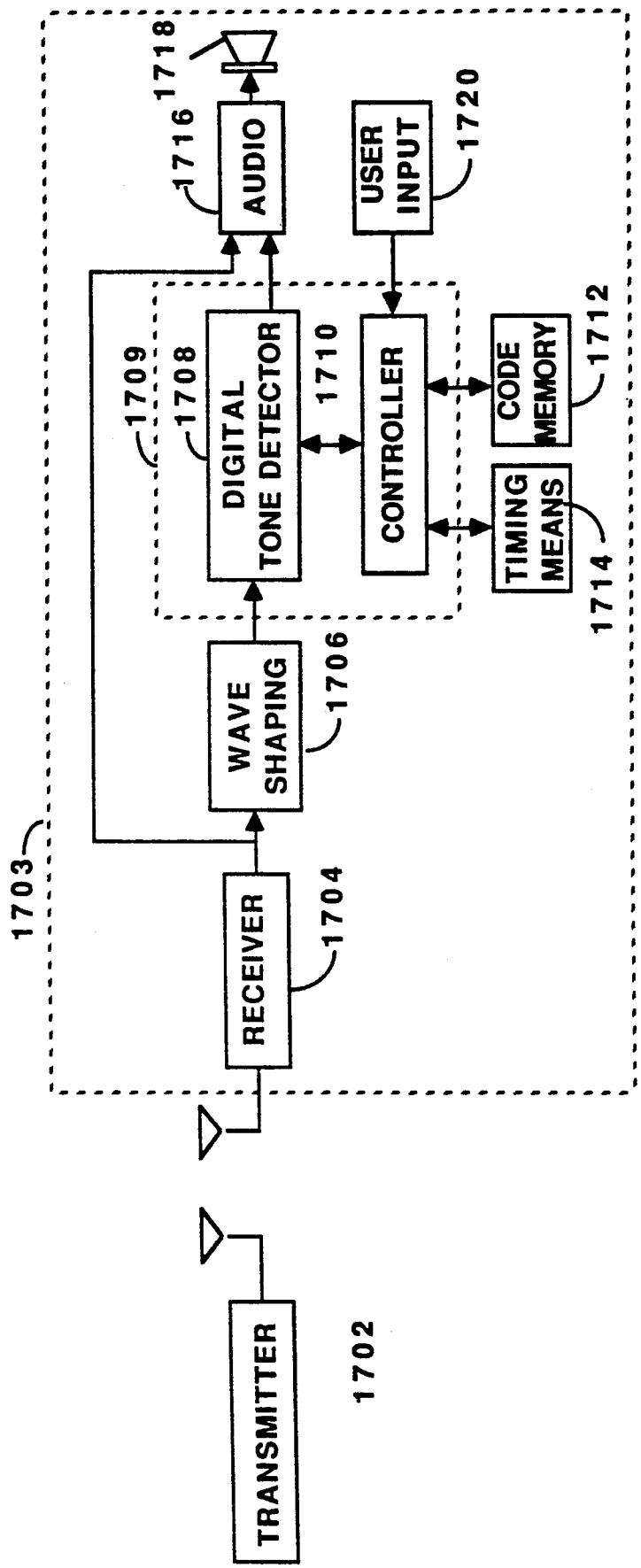
FIG. 17 is a block diagram of a selective call communication receiver utilizing the digital tone detector of the present invention.

FIG. 17 shows a block diagram of a typical selective call communication system, such as a paging system, in which a receiver having a decoder of the present invention would be utilized. Selective call paging signals, such as two tone, paging signals utilized in a tone and voice paging system, are transmitted from transmitter 1702. The format of the two tone, tone and voice paging format are well known in the art. The signals are received by a communication receiver 1703, such as a paging receiver, which includes a receiver portion 1704 for receiving the transmitted selective call paging signals. The output of receiver portion 1704 is an analog signal which couples to a wave shaping circuit 1706 and to the audio circuit 1716. The waveshaping circuit 1706 limits the analog signal input in a manner well known in the art, producing a stream of digital data representative of the audio tones transmitted, in this case, in the two tone format. The digital data is coupled into the input of the digital tone detector of the present invention 1708 which detects the presence of a desired tone in a manner as described above. A timing circuit, or means, 1714 couples to a controller 1710 which next couples to digital tone detector 1708 for controlling the operation of the tone detector for detecting in sequence the two serially transmitted tones. The timing means 1714 provides the timing signals for the controller operation and for the digital tone detector sampling and operation, as previously described. Controller 1710 and digital tone detector 1708 perform the well known decoding functions, operating as decoder 1709. In operation, controller 1710 recovers the frequency dependant decoder constants for the first desired tone which are stored in code memory 1712 to program the digital tone detector, as described above. After the first tone has been properly detected, the digital tone detector signals the detection to the controller 1710, which next recovers the frequency dependant decoder constants for the second desired tone which are stored in code memory 1712. Upon detection of the second desired tone, the digital tone detector signals the controller 1710, which generates an alert signal, alerting the user of the reception of the selective call voice message to follow. After a predetermined alerting time, the analog voice information present at the output of the receiver portion 1704 is amplified in the audio circuit 1716, and coupled into speaker 1718 for presentation of the voice message to the user. A user input 1720 allows the user to terminate the message, or to monitor the channel, in a manner well known in the art. One or more switches, and a volume control are generally available for the user input 1720.

It will be appreciated the digital tone decoder utilized in the communication receiver may be implemented with a tone detector solely utilizing the pseudo sinusoidal quadrature reference signals of the present invention, in which case improved decoder third harmonic rejection is achieved. The communication receiver may also be implemented with a tone detector using solely the "stepped" window function of the present invention, in which case improved sidelobe response is achieved. And the communication receiver may also be implemented with a tone detector using both the pseudo sinusoidal quadrature reference signals and "stepped" window function of the present invention, in which case both improved sidelobe response and improve third harmonic response are achieved.

It will be appreciated from the description given above, the pseudo sinusoidal tone decoder of the present invention is not limited just to decoding the two tone signaling protocol, wherein the tone spacing is held to a fixed percentage from tone to tone, thereby requiring the use of a substantially constant Q tone detector. The pseudo sinusoidal tone detector of the present invention can also be used in two tone signaling protocols having a predetermined frequency spacing between tones, thereby requiring the use of a substantially constant bandwidth tone detector. In addition, 5/6 tone signaling protocols, such as the Motorola 5/6 tone signaling protocol, the ZVEI and CCIR signaling protocols, and other tone coded signaling protocols may be readily decoded with the pseudo sinusoidal tone detector of the present invention, and the implementation of these tone detectors is greatly facilitated when a combination of hardware and software is used.

It will also be appreciated that the present invention provides a significant improvement in the frequency response of the filter at the center frequency due primarily to the "stepped" window function, while a significant reduction in the 3rd harmonic frequency response is due primarily to the pseudo sinusoidal reference signals utilized. Both the "stepped" window function and the pseudo sinusoidal reference signals contribute to an overall improvement in the response of the tone detector of the present invention as compared to the prior art digital tone detectors. Because of the flexibility provided by the programmability aspect of the pseudo sinusoidal tone detector of the present invention, both constant bandwidth and constant-Q tone detectors can be readily implemented without any significant change in the implementation of the tone detector. It will also be appreciated, that due to the simplicity of the implementation of the pseudo sinusoidal tone detector of the present invention, in hardware, hardware and software, or software only through the use of a microcomputer, a significant improvement in the current drain required, as compared to the prior art analog and digital implementations is obtained. Because of the programmability of the pseudo sinusoidal tone detector of the present invention, the tone detector is not limited to detection of only a single tone signaling format, but rather can be readily utilized for tone detection in all of the well known tone signaling formats.

It will also be appreciated from the description above, the use of the "stepped" window function provided a substantial improvement in the sidelobe responses of the filter, whereas the use of the pseudo sinusoidal reference signals improved the third harmonic response. Additional improvement in the third harmonic response is also obtained through the use of the "stepped" window function. It will be further appreciated, the use of the "stepped" window function alone would provide a substantial improvement in reducing the sidelobe responses of the prior art digital tone detectors, such as the tone detector described by Labedz, the implementation of which is compatible with such a tone detector.

While specific embodiments of this invention have been shown and described, further modifications and improvements will occur to those skilled in the art. All modifications which retain the basic underlying principles disclosed and claimed herein are within the scope and spirit of the present invention.

We claim:

1. A method of processing an input signal for the detection of at least one desired tone of a plurality of tones, said method comprising the steps of:
   generating quadrature phase reference signals using a quadrature phase reference signal generating means, the quadrature phase reference signals having periods representative of the desired tone frequency, and comprising a sequence of time intervals representing a predetermined number of phase subregions within the desired tone period, the phase reference signal amplitude generated within the phase subregions have corresponding pairs of phase amplitude values generated in a predetermined order from at least four predetermined amplitude values;
   sampling the input signal, using a signal sampling means, at a predetermined sampling rate to obtain a sequence of sampled input signals, the sampled input signals being obtained during corresponding phase subregions in accordance with the predetermined sampling rate;
   generating first and second correlation product values using a subwindow accumulating means to separately multiply the sampled input signal values with the pair of phase amplitude values corresponding thereto;
   generating first and second correlation sum values using a summing means to sum separately a predetermined number of the first and second correlation product values;
   obtaining absolute values of the first and second correlation sum values using an absolute value generating means, and combining the absolute values, in a predetermined manner within combining means to generate a total correlation sum value; and
   comparing, with a comparing means, the total correlation sum value to a predetermined threshold value, and in response thereto, generating a detection signal indicating the detection of the desired tone when the total correlation sum value exceeds the predetermined threshold value.

2. The method of processing an input signal according to claim 1, wherein the predetermined number of phase subregions corresponds to a sequence of at least eight phase subregions.

3. The method of processing an input signal according to claim 1, wherein the pairs of phase amplitude values are assigned from predetermined amplitude values of 1, 2, $-1$ or $-2$.

4. The method of processing an input signal according to claim 1, wherein said step of combining further comprises the step of:
   summing $A+0.5B$ when $A>B$; and
   summing $0.5A+B$ when $B>A$,
   where A is the absolute value of the first correlation sum value, and B is the absolute value of the second correlation sum value.

5. A method of processing an input signal for the detection of at least one desired tone of a plurality of tones, said method comprising the steps of:
   generating a reference signal pattern using a reference signal pattern generating means, the reference signal pattern having a period representative of the desired tone frequency and which provides an observation window comprising a predetermined number of subwindow time intervals representing at least first, middle and last portions of the pattern period;
   sampling the input signal, using a signal sampling means, at a predetermined rate to obtain a sequence of sampled input signals;
   generating subwindow accumulation values using a subwindow accumulating means by correlating a predetermined number of sampled input signal values with the reference signal pattern generated during the corresponding subwindow time intervals;

storing sequentially, in a plurality of registers, the subwindow accumulation values associated with the first, middle and last portions of the observation window;

generating weighted subwindow accumulation values using a subwindow weighting means to weight the stored subwindow accumulation values corresponding to the first and last portions of the observation window with a first weighting value, and by further weighting the stored subwindow accumulation values corresponding to the middle portion with at least a second weighting value;

generating a total correlation sum value using an summing means to sum the stored weighted subwindow accumulation values generated during the observation window;

comparing with a comparing means the total correlation sum value generated to a predetermined threshold value, and in response thereto, generating a tone detection signal indicating the detection of the desired tone when the total correlation sum value exceeds the predetermined threshold value.

6. The method of processing an input signal according to claim 5, wherein the first and last portions of the observation window represents time intervals which are each substantially one-fifth of the observation window.

7. The method of processing an input signal according to claim 6, wherein the first weighting value is assigned a value of 1, and wherein the second weighting value is assigned a value of 2.

8. The method of processing an input signal according to claim 5, wherein said step of generating the phase reference signal, further comprises the step of generating a phase reference signal having quadrature components.

9. The method of processing an input signal according to claim 8, wherein said step of generating subwindow accumulation values generates quadrature subwindow accumulation values during the subwindow time interval correlations by multiplying the sequence of sampled input signals with two predetermined sequences of quadrature amplitude values to obtain first and second quadrature subwindow accumulation values.

10. The method of processing an input signal according to claim 9, wherein said step of storing sequentially stores the first and second quadrature subwindow accumulation values, said step of generating subwindow accumulation values multiplies the stored first and second quadrature subwindow accumulation values with the corresponding first and second weighting values to obtain. first and the second weighted quadrature subwindow accumulation values, and said step of generating a total correlation sum value comprises the steps of:

generating first and second correlation sums values by separately summing the first and the second sequence of stored weighted quadrature subwindow accumulation values;

obtaining absolute values of the first and second correlation sum values; and generating the total correlation sum value by summing the absolute values of the first and second correlation sum values.

11. A tone detector for detecting the presence of at least one desired tone of a plurality of tones in an input signal, said tone detector comprising:

timing means, for generating timing signals at a predetermined rate;

phase reference signal generating means, responsive to the timing signals, for generating a phase reference signal having a period representative of the desired tone frequency;

decoder means, coupled to said phase reference signal generating means and responsive to the phase reference signals being generated, for generating a pair of quadrature phase reference signals comprising a sequence of time intervals representing a predetermined number of phase subregions within the desired tone period, the quadrature phase reference signals being generated within the phase subregions having phase amplitude values generated in a predetermined order from at least four predetermined amplitude values;

sampling means, coupled to the input signal and responsive to the timing signals, for sampling the input signal to obtain a sequence of sampled input signals, the sampled input signal values generated being distributed within the phase subregions in accordance with the predetermined sampling rate;

subwindow accumulating means, coupled to said sampling means and said decoder means, for multiplying the sampled input signal values by the pair of quadrature phase amplitude signal values generated within the corresponding phase sub region, to generate first and second correlation product values;

summing means, coupled to said subwindow accumulating means, for summing separately a predetermined number of the first and second correlation product values, to generate first and second correlation sum values;

absolute value generating means, coupled to said summing means, for obtaining absolute values of the first and second correlation sum values;

combining means, for combining in a predetermined manner, the absolute values of the first and second correlation sum values to generate a total correlation sum value; and comparing means, coupled to said combining means, for comparing the total correlation sum value to a predetermined threshold value, and in response thereto, for generating a detection signal indicating the detection of the desired tone when the total correlation sum value generated exceeds the predetermined threshold value.

12. The tone detector according to claim 11, wherein said decoder means generates the quadrature phase reference signals having a sequence of at least eight phase subregions.

13. The tone detector according to claim 11, wherein said decoder means assigns the pair of amplitude values from predetermined amplitude values of 1, 2, −1 and −2.

14. The tone detector according to claim 11, wherein said combining means combines $A + 0.5B$ when $A > B$, and further combines $0.5A + B$ when $B > A$, where A is the absolute value of the first correlation sum value, and B is the absolute value of the second correlation sum value.

15. A tone detector for detecting the presence of at least one desired tone of a plurality of tones in an input signal, said tone detector comprising:

timing means, for generating timing signals at a predetermined rate;

sampling means, coupled to the signal input and responsive to the timing signals, for sampling the input signal to obtain a sequence of sampled input signals;

reference signal generating means, responsive to the timing signals, for generating a reference signal pattern having a period representative of the desired tone frequency and which provides an observation window comprising a predetermined number of subwindow time intervals representing at least first, middle and last portions of the pattern period;

subwindow accumulating means, coupled to said reference signal generating means and to said sampling means, for accumulating a predetermined number of sampled input signals with the reference signal pattern generated during corresponding subwindow time intervals, to generate a sequence of subwindow accumulation values;

means for sequentially storing the subwindow accumulation values generating during the first, middle and last portions of the observation window;

subwindow weighting means, coupled to said storing means, for weighting the stored subwindow accumulation values corresponding to the first and last portions of the observation window with a first weighting value, and further for weighting the stored subwindow accumulation values corresponding to the middle portion of the observation window with at least a second weighting value, to generate weighted subwindow accumulation values;

summing means, coupled to said subwindow weighting means, for summing the stored weighted subwindow accumulation values generated during the at least first, middle, and last portions of the observation window, to generate a total correlation sum value; and comparing means, coupled to said summing means, for comparing the total correlation sum value generated to a predetermined threshold value, and in response thereto, generating a detection signal indicating the detection of the desired tone when the total correlation sum value exceeds the predetermined threshold value.

16. The tone detector according to claim 15, wherein the first and last portions of the observation window represent time intervals which are each substantially one-fifth of the observation window.

17. The tone detector according to claim 15, wherein the first weighting value is assigned a value of 1, and wherein the second weighting value is assigned a value of 2.

18. The tone detector according to claim 15, wherein the predetermined number of stored subwindow accumulations representing the observation window is evenly divisible by five.

19. A selective call receiver, comprising:
a receiver for receiving selective call message signals including at least one desired tone signal designating the receiver to which a message is directed, to provide an input signal;
a tone decoder, coupled to said receiver, comprising
timing means, for generating timing signals at a predetermined rate,
phase reference signal generating means, responsive to the timing signals, for generating a phase reference signal having a period representative of the desired tone frequency decoder means, coupled to said phase reference signal generating means and responsive to the phase reference signals being generated, for generating a pair of quadrature phase reference signals comprising a sequence of time intervals representing a predetermined number of phase subregions within the desired tone period, the quadrature phase reference signals being generated within the phase subregions having phase amplitude values generated in a predetermined order from at least four predetermined amplitude values, sampling means, coupled to the input signal and responsive to the timing signals, for sampling the input signal to obtain a sequence of sampled input signals, the sampled input signal values generated being distributed within the phase subregions in accordance with the predetermined sampling rate, subwindow accumulating means, coupled to said sampling means and said decoder means, for multiplying the sampled input signal values by the pair of quadrature phase amplitude signal values generated within the corresponding phase subregion, to generate first and second correlation product values, summing means, coupled to said first multiplying means, for summing separately a predetermined number of the first and second correlation product values, to generate first and second correlation sum values;

absolute value generating means, coupled to said summing means, for obtaining absolute values of the first and second correlation sum values;

a combining means, for combining in a predetermined manner, the absolute values of the first and second correlation sum values to generate a total correlation sum value, and comparing means, coupled to said combining means, for comparing the total correlation sum value to a predetermined threshold value, and in response thereto, for generating a detection signal indicating the detection of the desired tone when the total correlation sum value generated exceeds the predetermined threshold value; and alerting means, responsive to the detection signal, for generating a sensible alert indicating the reception of the message directed thereto.

20. A selective call receiver, comprising:
a receiver for receiving selective call message signals including at least one desired tone signal designating the receiver to which a message is directed, to provide an input signal;
a tone decoder, coupled to said receiver, comprising
timing means, for generating timing signals at a predetermined rate,
reference signal generating means, responsive to the timing signals, for generating reference signals having a period representative of the desired tone frequency, and which provides an observation window comprising a predetermined number of subwindow time intervals representing at least first, middle and last portions of the time period,
sampling means, responsive to the timing signals, for sampling the input signal to obtain a sequence of sampled input signals during the at least first, middle and last portions of the observation window, subwindow accumulating means, coupled to said reference signal generating means and to said sampling means, for accumulating a predetermined number of sampled input signals with the reference signal pattern generated during corresponding subwindow time intervals, to generate a sequence of subwindow accumulation values, weighting means, coupled to said subwindow accumulating means, for weighting the subwindow accumulation values corresponding to the first and last portions of the observation window with a first weighting value, and the subwindow accumulation values corresponding to the middle portion of the observation window with at least a second weighting value, summing means, coupled to said weighting means, for summing the stored weighted subwindow accumulation values generated during the at least first, middle, and last portions of the observation window, to generate a total correlation sum value, and comparing means, coupled to said summing means, for comparing the total correlation sum value generated to predetermined threshold value, and in response thereto, generating a detection signal indicating the detection of the desired tone when the total correlation sum value exceeds the predetermined threshold value; and alerting means, responsive to the detection signal, for generating a sensible alert indicating the reception of the message directed thereto.

* * * * *